July 23, 1957  F. E. STRATTON  2,799,875
HEEL END ASSEMBLING AND BREAST LINE LASTING MACHINES
Filed Aug. 21, 1953  10 Sheets-Sheet 1

Inventor
Frank E. Stratton
By his Attorney

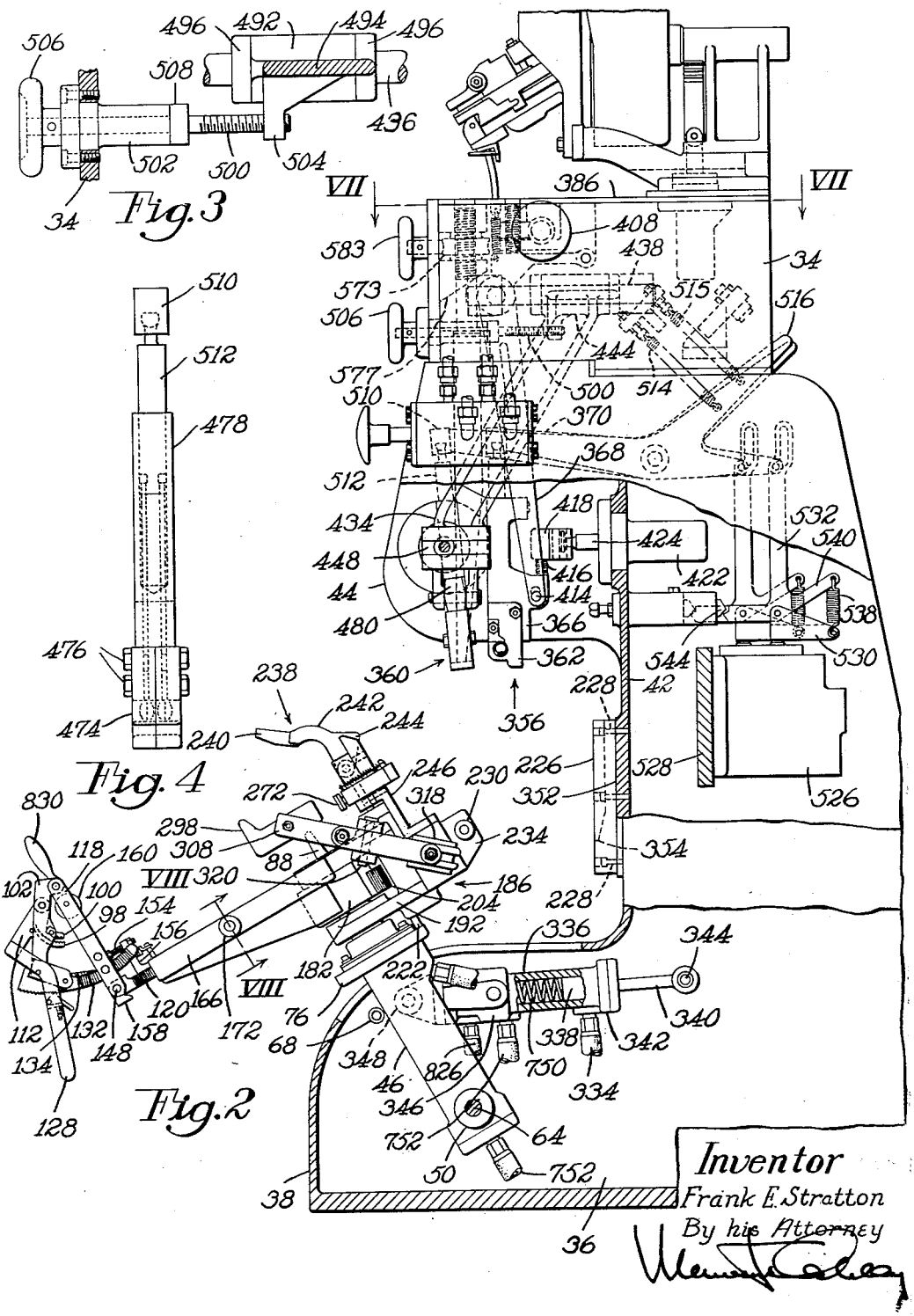

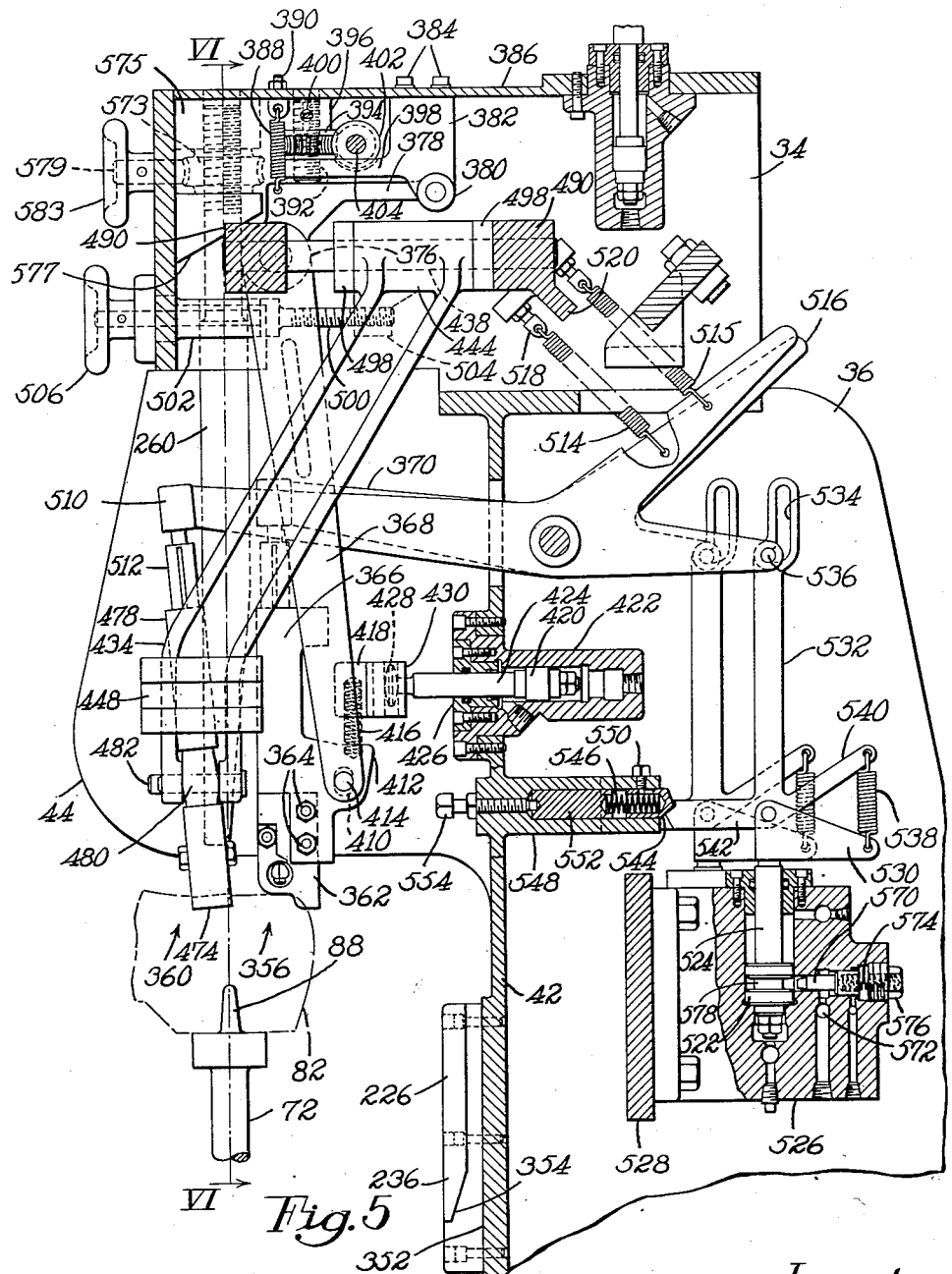

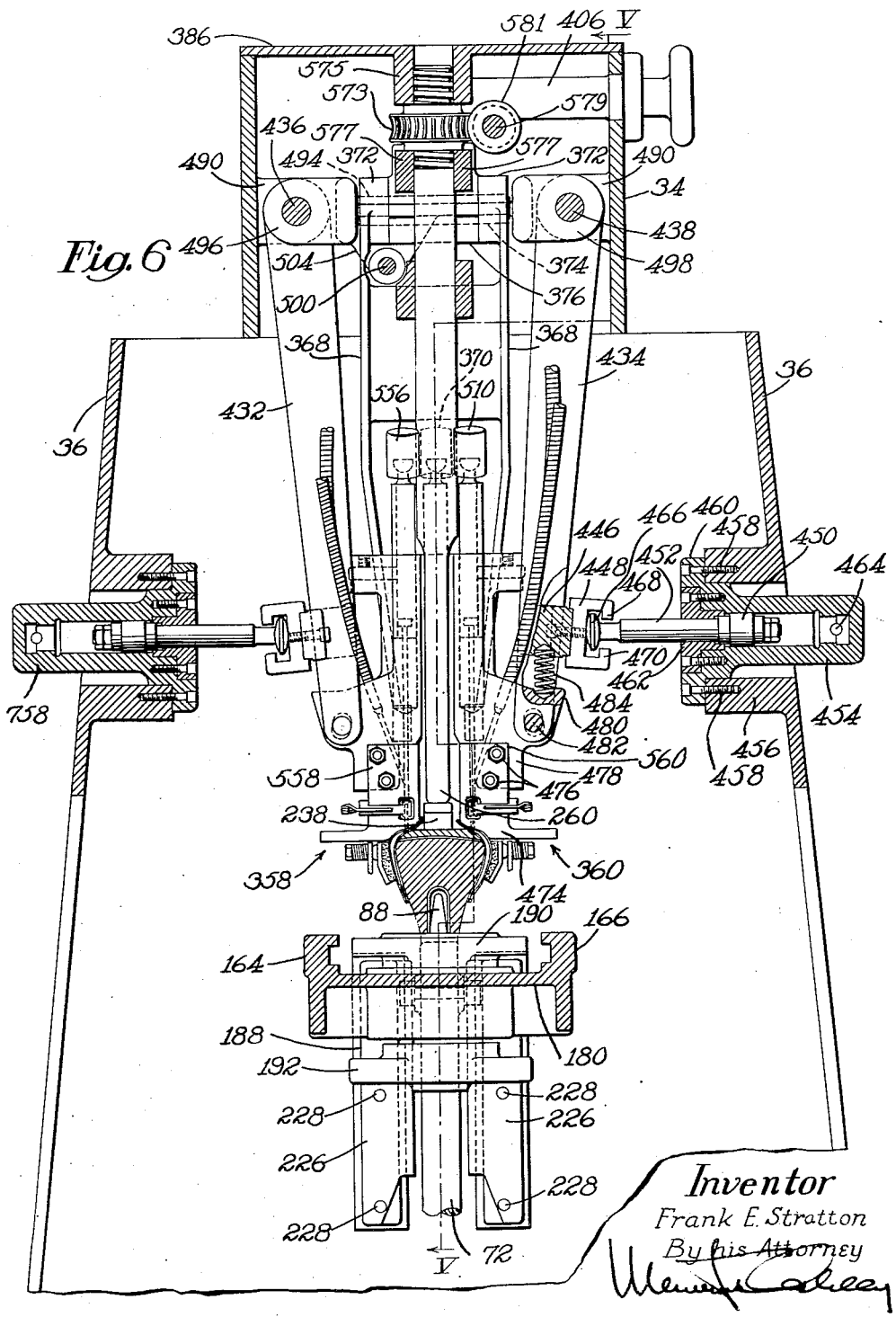

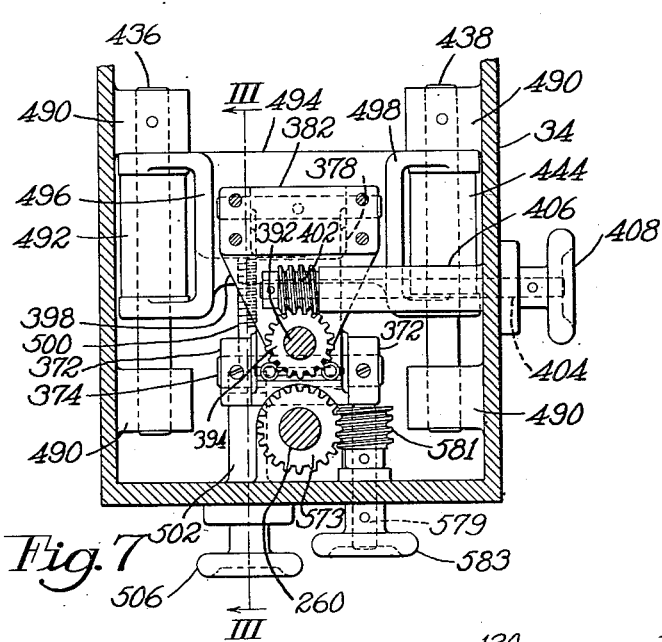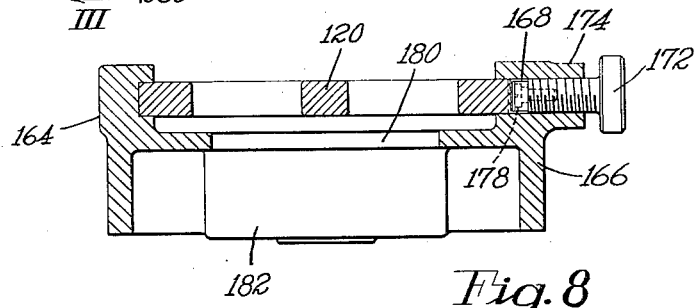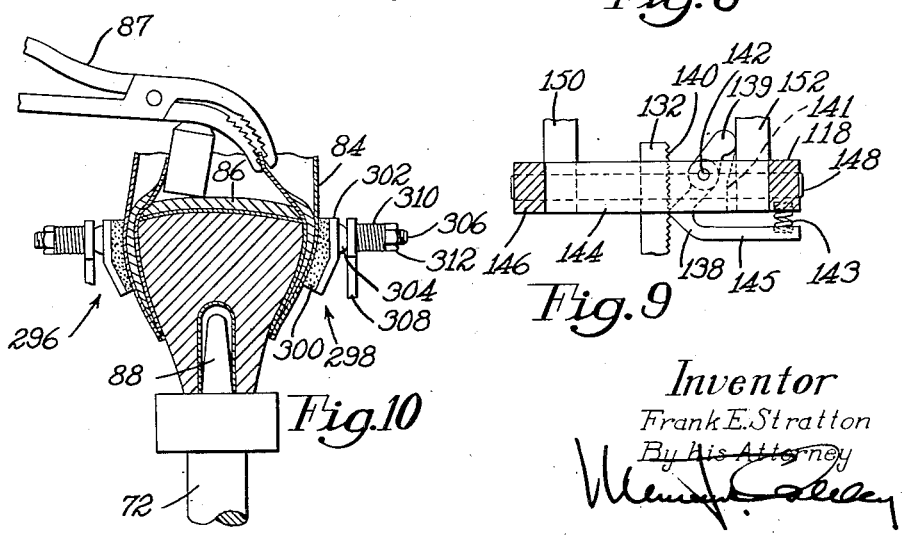

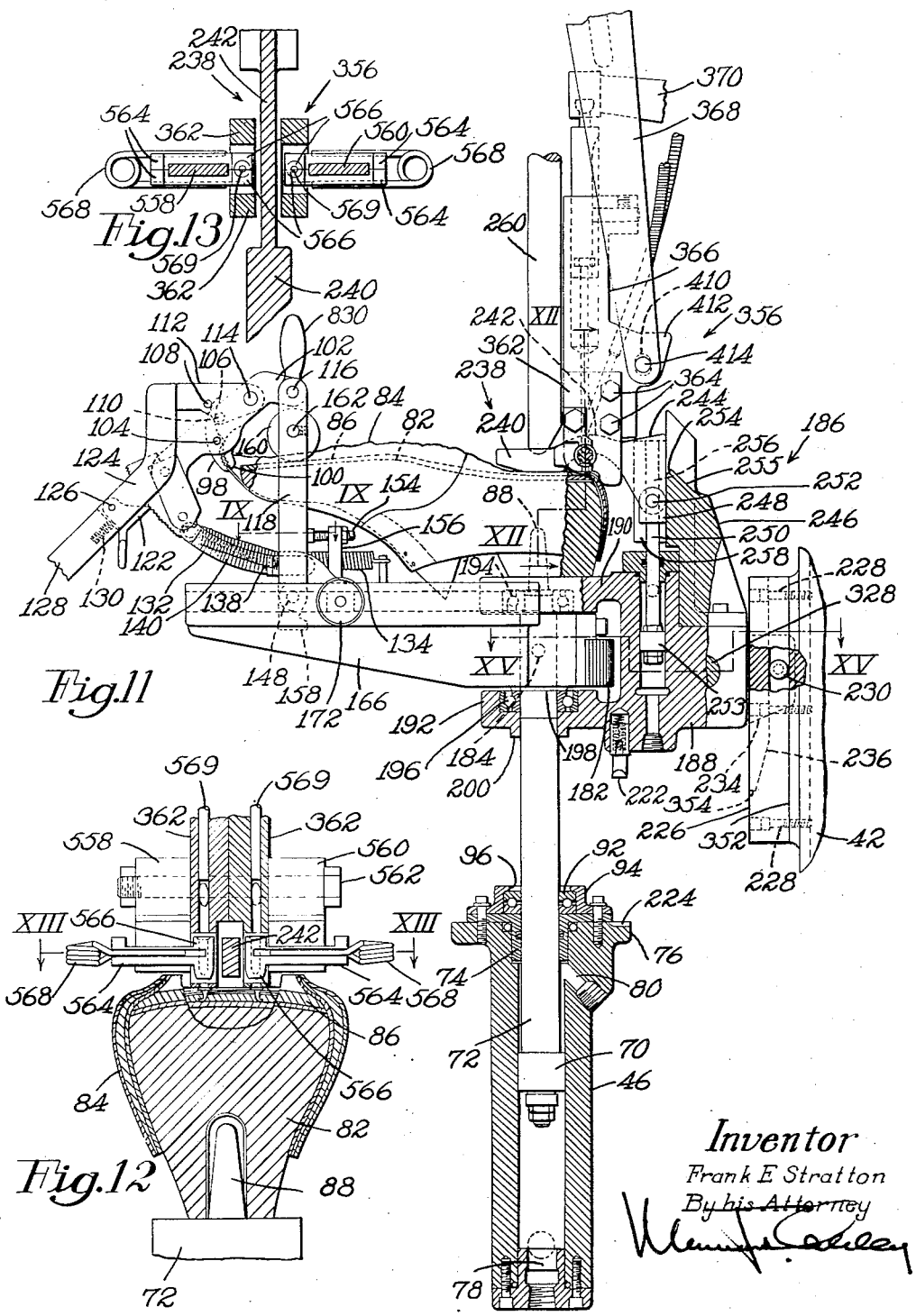

July 23, 1957   F. E. STRATTON   2,799,875
HEEL END ASSEMBLING AND BREAST LINE LASTING MACHINES
Filed Aug. 21, 1953   10 Sheets-Sheet 7

Inventor
Frank E. Stratton
By his Attorney

Inventor
Frank E. Stratton
By his Attorney

July 23, 1957 F. E. STRATTON 2,799,875
HEEL END ASSEMBLING AND BREAST LINE LASTING MACHINES
Filed Aug. 21, 1953 10 Sheets-Sheet 9

Inventor
Frank E. Stratton
By his Attorney

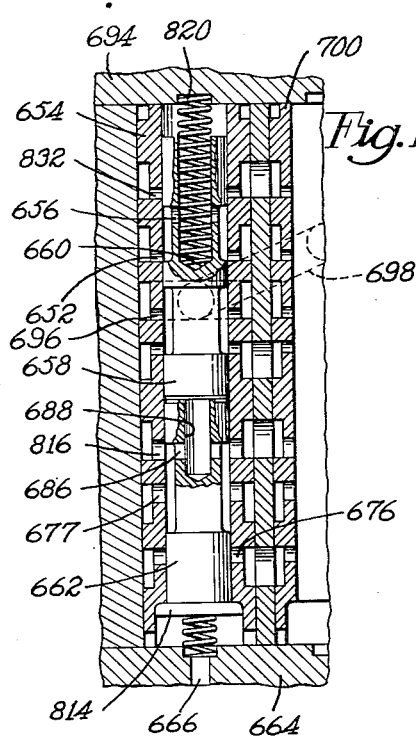
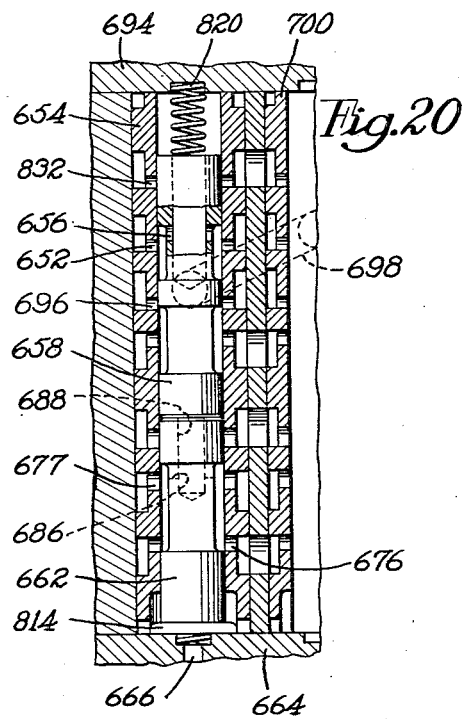
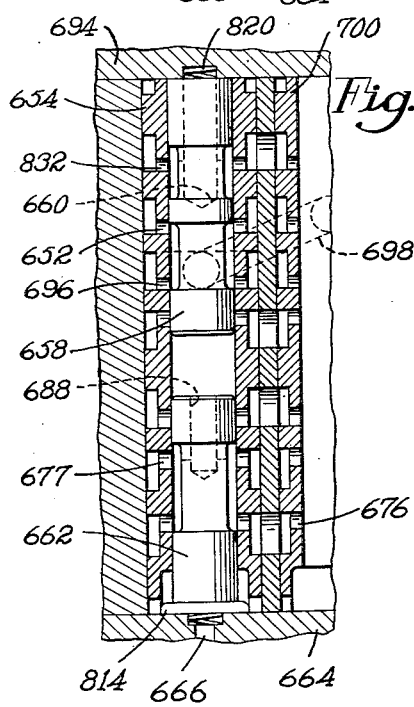
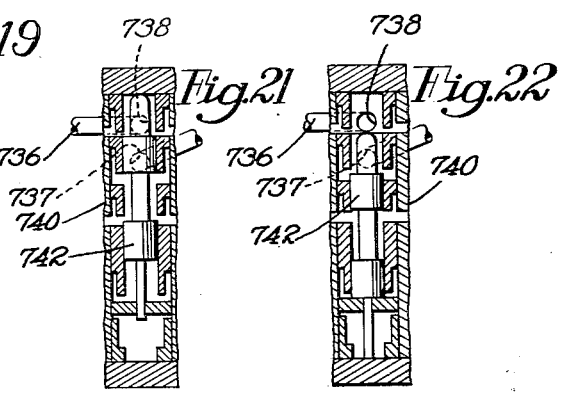

2,799,875

HEEL END ASSEMBLING AND BREAST LINE LASTING MACHINES

Frank E. Stratton, Beverly, Mass., assignor to United Shoe Machinery Corporation, Flemington, N. J., a corporation of New Jersey Application August 21, 1953, Serial No. 375,692

69 Claims. (Cl. 12—12.3)

This invention relates to shoe machines and is herein illustrated in its application to machines for use in assembling shoe upper parts upon a last and shaping the heel end portions of the shoe upper parts about the last. In certain aspects thereof the invention is not limited to machines for use in assembling shoe upper parts upon a last but is applicable as well to other types of shoe machines.

The shaping of the breast line portions of shoe upper materials is usually performed manually by the side lasting machine operator. This operation consists in pulling up the counter wings by means of hand pincers and tensioning the lining and the upper as may be required to eliminate any wrinkles that may have occurred therein and to position said parts in proper relation to each other and to the last.

It is an object of the present invention to provide for use in assembling shoe upper parts on a last a machine the construction and operation of which permits the performance of the breast line lasting operations by hand pincers in conjunction with the assembling operation. It is a further object of the invention to provide in such a machine an organization which will greatly facilitate the breast line lasting operations and enable the operator to perform these operations more accurately and reliably than heretofore.

With the above objects in view the present invention in one aspect thereof consists in the provision in a shoe machine of a pair of end presser members operable by power to clamp one extremity of a shoe upper against a form, a pair of side presser members and power operated means for successively actuating the side presser members to clamp oppositely disposed side portions of the upper against the form. In order to provide for the tensioning of the shoe upper parts and the adjustment of the wing of a counter stiffener at one side of the heel portion of the shoe after the operation of one side presser member and before the operation of the companion side presser member the illustrated machine, in accordance with a feature of the invention, is provided with means herein illustrated as a valve operable to cause the machine to be at rest during a period following the operation of the first presser member and preceding the operation of the second presser member. To the same end the illustrated machine is provided with means, herein illustrated as a valve, operable to cause the machine to be at rest during a period following the actuation of the end presser members and preceding the actuation of the first side presser member. In order to provide for an inspection of the shoe after the operation of the second side presser member the illustrated machine is provided with means herein illustrated as a valve, operable to cause the machine to be at rest during a period following the operation of the second side presser member and preceding the operation of a wiping means for wiping a portion of the lasting margin of the upper over an insole on the last bottom.

In order to provide for the tensioning of the upper lengthwise thereof on the last the illustrated machine is provided with a novel gripper assembly comprising a lever carrying a pair of gripper jaws and fulcrumed on a member or arm which in turn is pivotally mounted on a carrier having means for determining a position of the arm relatively to the carrier for the upper tensioning operation. The carrier is provided with means for mounting a last having an upper thereon and means, herein illustrated as an eccentric roll, for determining the position of the last heightwise thereof on the carrier. For the operation of the gripper jaws a hand lever is fulcrumed on the lever on which the jaws are mounted, the hand lever being operable first to close the gripper jaws and thereafter to impart a movement of translation thereto. For holding the gripper jaws closed a pawl holds the hand lever against return movement and for maintaining the tension imparted to the upper by the gripper jaws a second pawl acts on the lever on which the gripper jaws are mounted. To provide for the return of the gripper assembly to its rest position relatively to the arm on which the gripper assembly is mounted a cam operates to release the second pawl during a movement of the arm to retract the gripper assembly into a position remote from the shoe to provide clearance for the removal of the shoe from the machine.

The illustrated machine is provided with a novel work supporting means which comprises, in addition to the carrier above referred to, a head and an elevator herein illustrated as a piston on which the carrier and the head are mounted for relative angular movement, suitable means, including a normally retracted locking member, being provided for fixing the relative orientation of the carrier and the head and determining the orientation of the assembly comprising the carrier and the head relatively to the elevator. Preparatory to the operation of the machine the carrier and the head are adjusted relatively to each other in accordance with the angular disposition of the longitudinal median line of the heel portion of the last relatively to the longitudinal median line of the forepart. The orientation of the work supporting assembly relatively to the frame serves to position the last and the upper thereon relatively to the instrumentalities for wiping the lasting margin at the heel end of the upper over an insole on the last bottom. The head above referred to mounts the heel end clamping instrumentalities, and the carrier, it will be remembered, mounts the toe gripper assembly. The heel end clamping instrumentalities comprise, in the illustrated organization, a last holddown and presser members for clamping the extremity of the heel end portion of the upper against the last. A suitable detent is provided for fixing the relative orientation of the carrier and the head. In the illustrated organization the heel end clamping instrumentalities and the detent are advanced into operative position by fluid pressure preparatory to the hand pincer operations at the breast line portion of the upper and the fluid pressure holds the instrumentalities in clamping position and holds the detent in locking position during a rest period in the power cycle of the machine provided for the manual operations at the breast line. The illustrated last holddown member is mounted for angular movement to and from operative position and an abutment member carried by the head serves to maintain the holddown member rigidly in operative position. For holding the head against angular movement on the piston rod and thereby determining the angular disposition of the head relatively to the machine frame, means herein illustrated as fixed cam members engage the head during upward movement of the piston and serve to hold the head against angular movement. Means herein illustrated as a latch member in the head serves to determine the orientation of the head when the piston is at the limit of its downward movement. In the illustrated organization the latch member engages the head of a cylinder in which the piston is mounted.

The illustrated machine is provided with a novel wiper assembly which is the subject of my application for United States Letters Patent, Serial No. 562,481, filed January 31, 1956, which is a division of the present application.

For securing the overwiped margin of the upper to the insole the illustrated machine is provided with a novel tack driving means which is the subject of my application for United States Letters Patent, Serial No. 562,482, filed January 31, 1956, which is a division of the present application.

These and other features of the invention will now be described with reference to the accompanying drawings and pointed out in the appended claims.

In the drawings,

Fig. 2 is an enlarged view in right side elevation of the head of the machine with a portion of the machine frame broken away;

Fig. 3 is a section on the line III—III of Fig. 7;

Fig. 4 is a greatly enlarged view in front elevation of the wiper and tacker unit which operates on the back line portion of the upper;

Fig. 5 is a view of the head of the machine partly in right side elevation and partly in section on the line V—V of Fig. 6;

Fig. 6 is a view partly in front elevation and partly in section on the line VI—VI of Fig. 5;

Fig. 7 is a section on the line VII—VII of Fig. 2;

Fig. 8 is a sectional view, greatly enlarged, taken on the line VIII—VIII of Fig. 2;

Fig. 9 is a sectional view greatly enlarged taken on the line IX—IX of Fig. 11;

Fig. 10 is a front elevation showing parts of the work supporting and clamping mechanism with a sectional showing of the heel end portion of a last and shoe upper parts thereon and a pair of hand pincers arranged to tension the shoe lining;

Fig. 11 is a view partly in right side elevation and partly in section through the center of the machine illustrating the work supporting mechanism with a shoe mounted thereon and presented to the operating instrumentalities of the machine;

Fig. 12 is a section on the line XII—XII of Fig. 11;

Fig. 13 is a section on the line XIII—XIII of Fig. 12;

Figs. 18, 19 and 20 are enlarged sectional views illustrating a valve assembly in its positions at three different stages in the machine cycle; and Figs. 21 and 22 are sectional views of a differential valve shown at the opposite extremes of its operating movement.

Figure 1:
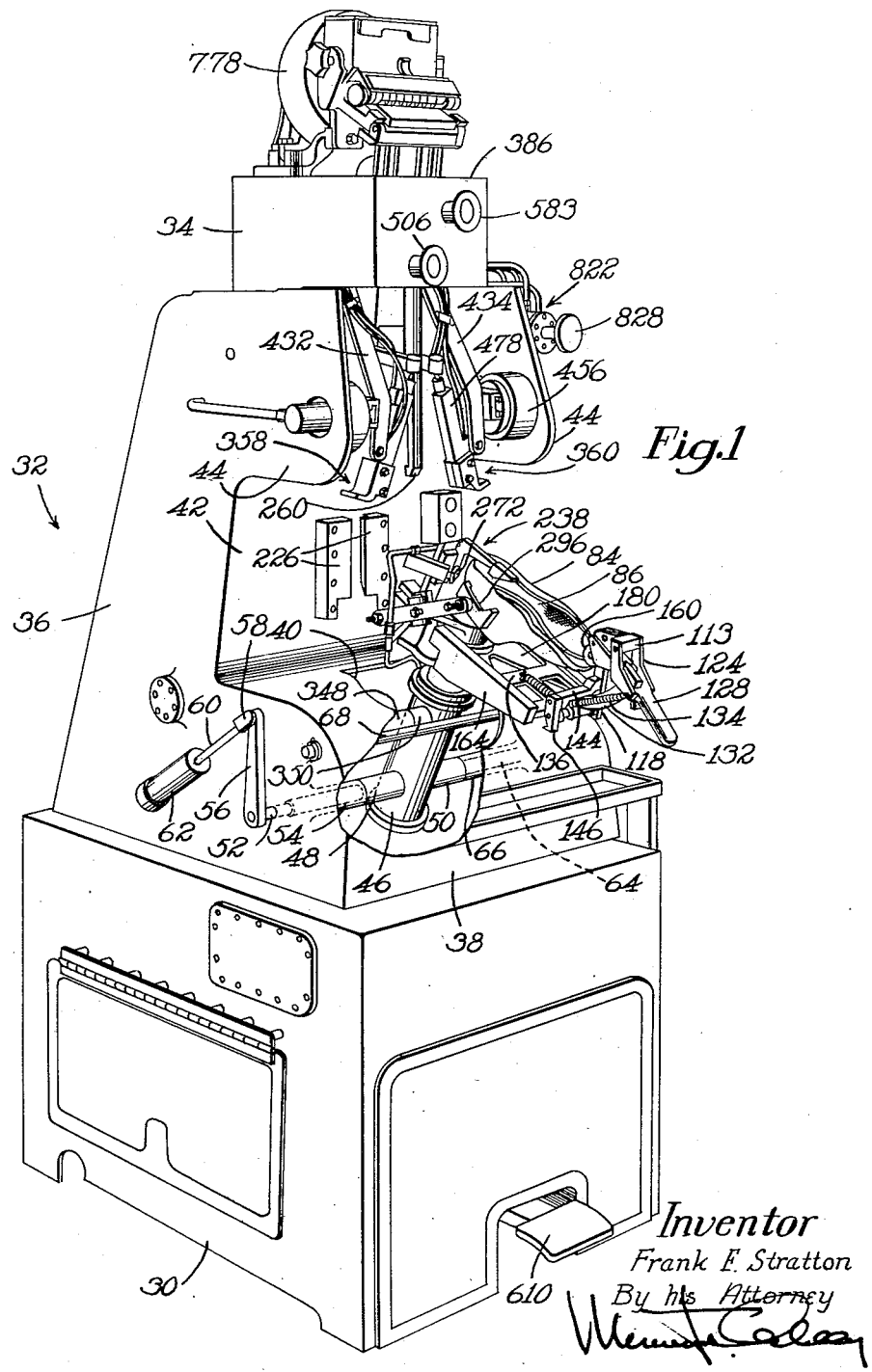
Fig. 1 is a perspective view of a machine embodying the features of the present invention.

The invention is embodied in a hydraulically operated machine in which shoe upper parts mounted on a last are supported in inverted position on a last pin projecting upwardly from a work supporting member which, in its rest position, is inclined forwardly into a position convenient for the mounting of the last on the last pin and the performance of manual operations on the upper. For positioning the upper relatively to the last for the operations to be performed thereon the work supporting assembly includes a manually operated gripper constructed and arranged to engage the toe end of the lasting margin of the upper and operable to impart toeward tension to the upper and to hold the upper so tensioned during the operation of the machine. The toe gripper assembly is mounted on a carrier which itself is mounted in a supporting structure comprising the head of the work supporting assembly, and the carrier and the head are free to swing independently of each other on a common axis which coincides with the axis of the last pin. When the machine is at rest the head is yieldingly held in a predetermined position by a detent and the carrier is free to swing relatively to the head in order to permit the operator to adjust the shoe so that the longitudinal median line of the rear part of the shoe lies approximately in a plane extending from front to back of the machine.

While manually holding the carrier in adjusted position the operator depresses a treadle to initiate the hydraulic cycle of the machine. For reasons hereinafter explained the hydraulic cycle is divided into four parts and the machine comes to rest at the end of each part of its cycle and remains at rest until the treadle is operated to initiate the next part of the hydraulic cycle. During the first part of the hydraulic cycle a holddown is swung downwardly onto the heel end portion of an insole on the last bottom to hold the last against heightwise displacement, and substantially concomitantly with the downward movement of the holddown, two pads are advanced in forwardly converging paths into engagement with the upper at opposite sides of the back line in order to hold the heel end portion of the upper against displacement relatively to the last. The initial operation of the treadle also causes a locking bolt to be advanced by fluid pressure to lock the shoe carrier against further swinging movement relatively to the head in which the carrier is mounted. Upon the completion of the first part of the hydraulic cycle of the machine the operator inspects the positions of the shoe parts at one side of the breast line portion of the shoe and makes any adjustments that may be required, preferably with the aid of hand pincers. In order to facilitate the hand pincer operations the shoe carrier and the head may be swung as a unit on their common axis in order to adjust the angular disposition of the shoe relatively to the operator. After the adjustments of the upper parts at one side of the breast line portion of the shoe have been effected the treadle is again operated to cause a pad carried by the swinging head to be advanced by fluid pressure into engagement with the upper and to apply clamping pressure to the upper in order to secure the upper, the wing of the counter and the lining in the position relatively to the last in which they have been located by the hand pincers. The work supporting assembly is then swung into a position suitable for the breast line operations at the opposite side of the shoe and upon the completion thereof the treadle is again operated to cause a pad carried by the head to be advanced by fluid pressure to clamp the upper, the counter and the lining against the last at that side of the shoe.

The machine now comes to rest to permit the operator to swing the work supporting assembly back into its initial position in order to orient the shoe for the succeeding operations thereon. In the illustrated organization this position of the assembly is accurately determined by the engagement of a detent carried by the swinging head in a suitable recess in the head of a cylinder comprising the base portion of the work supporting assembly. With the swinging head in this position the shoe is so oriented that the longitudinal median line of its rear portion lies in a vertical plane extending from front to back of the machine and after the shoe has been advanced to the lasting station by movement of the work supporting assembly the rear part of the shoe is correctly oriented with relation to the lasting instrumentalities without further adjustment thereof. After returning the work supporting assembly to its initial position the operator inspects the work to determine whether the heel end portion of the upper has been properly positioned on the last. If the inspection indicates that the upper is incorrectly positioned on the last the operator presses a plunger in the front of the machine to release the hydraulic pressure against the work clamping instrumentalities and to return said instrumentalities to their respective rest positions. Thereupon the position of the upper on the last is corrected and the operator again depresses the treadle to initiate the hydraulic cycle of the machine whereupon the operations proceed as above described through the first three parts of the hydraulic cycle. If an inspection of the work after the hand pincer operations at the heel breast line indicates that the upper is correctly positioned on the last, the treadle is again operated to initiate the fourth and final part of the hydraulic operations of the machine. In the order of their occurrence the operations in the fourth part of the hydraulic cycle comprise first, a rearward swinging movement of the work supporting assembly to bring it into an upright position, second, the elevation of the assembly to bring the shoe into its lasting station which is determined by the engagement of the holddown with an abutment member, third, the advancement of a back line wiper and two breast line wipers concomitantly to wipe the lasting margin of the upper over upon the insole, and fourth, upon completion of the wiping operations, the release of latches to permit previously loaded springs to drive six tacks, two at opposite sides of the heel breast portion and two at the back line, to secure the overlasted margin of the upper to the insole and to secure the counter and the lining in the position in which they were located by the manual operations hereinbefore described. Immediately after the tack driving operations the tack drivers are retracted and the tack driving springs are reloaded for the next succeeding operation of the machine. After the driving springs have been reloaded locking members are advanced to hold the tack drivers in their retracted positions and thus to prevent inadvertent release of the tack drivers when the machine is at rest. Substantially concomitantly with the retraction of the tack drivers the work supporting assembly is moved downwardly and then swung forwardly into its initial or rest position and thereupon the shoe clamping members are retracted and the holddown is moved heightwise of the shoe away from the shoe bottom and swung rearwardly to provide clearance for the removal of the shoe from the work support after the toe gripper has been manually disengaged from the upper.

Referring now to Fig. 1, the illustrated machine comprises a base frame 30 which houses the power plant and the hydraulic valve assemblies, a head frame 32 and a housing 34 mounted on the top of the head frame and enclosing mechanism for adjusting certain operating instrumentalities. The head frame comprises two side plates 36 which are supported on the top of the base frame and converge upwardly from the base frame to the housing. The side plates are connected together by a front plate 38 the opposite side edges of which are welded to the forward edges of the side plates. The head frame is supported by its bottom edges on the top of the base frame 30 and is offset inwardly slightly from the front and the sides of the base frame. The head frame is characterized by a lower portion which houses parts of the work supporting assembly and a waist portion in which the front plate is offset rearwardly at 42 and occupies a position substantially midway between the front and the back of the machine. The front plate curves upwardly and rearwardly from the base frame to the rearwardly offset portion 42 which extends vertically upwardly to the housing 34. The upper portions of the side plates 36 have forward extensions or wings 44 on which are mounted certain operating instrumentalities. The housing 34 has mounted therein mechanism for adjusting the operating instrumentalities in accordance with the size of the shoe to be operated upon. A tack supplying and feeding mechanism of known construction is mounted on the top of the housing 34 and arranged to supply tacks to tack driving mechanisms hereinafter described.

The illustrated work supporting assembly comprises a cylinder 46 having in its lower portion bosses 48 and 50 extending in opposite directions therefrom. Fixed in the boss 48 is a trunnion pin 52 which is journalled in a bearing in a boss 54 extending inwardly from the left side plate 36 and having its end face in contiguous relation to the end face of the boss 48. The trunnion pin 52 extends through an opening in the left side plate 36 and has fixed to its left end portion an arm 56 pivotally connected at its free end to a head 58 at the outer end of a piston rod 60 operating in a dash pot cylinder 62 pivotally mounted on the left side plate 36. Fixed in the boss 50 on the right side of the cylinder 46 is a trunnion pin 64 which is journalled in a bearing in a boss 66 extending inwardly from the right side plate 36 and having its end face arranged in contiguous relation to the end face of the boss 50. Thus the cylinder 46 is held against movement widthwise of the machine by the bosses 54 and 66 while permitted to swing on the bearings of the trunnion pins in said bosses from a vertical position shown in Fig. 11 to a forward or rest position shown in Fig. 1 and determined by the engagement of the upper part of the cylinder with a horizontal rod 68 extending widthwise of the machine and mounted in the forwardly extending lower portions of the side plates 36. The cylinder 46 projects upwardly through an opening 40 in the curved lower portion of the front plate 38, said opening providing the required clearance for the movements of the upper end portion of the cylinder forwardly and rearwardly of the machine. Mounted in the cylinder 46 is a piston comprising a head 70 (Fig. 11) and a rod 72 extending upwardly from the head 70 through a stuffing box 74 in the head 76 of the cylinder. In its base the cylinder is provided with a port 78 through which pressure fluid is transmitted for elevating the piston to bring the work support into its position shown in Fig. 11. A port 80 is formed in the head of the cylinder to provide for the transmission of pressure fluid to the upper portion of the cylinder for returning the work supporting assembly to its rest position shown in Fig. 1. For supporting a last 82 having a lined upper 84 and an insole 86 mounted thereon, the piston rod 72 has a tapered last pin 88 at its upper extremity. When the last is mounted on the last pin 88 the work supporting assembly is in its rest position shown in Fig. 2. In this position the weight of the assembly mounted on the piston rod 72 is taken by a thrust bearing 92 (Fig. 11) at the upper extremity of the cylinder 46, said thrust bearing being retained within a flanged collar 94 secured to the head 76 and having a lip 96 extending inwardly over the thrust bearing.

Figure 16:
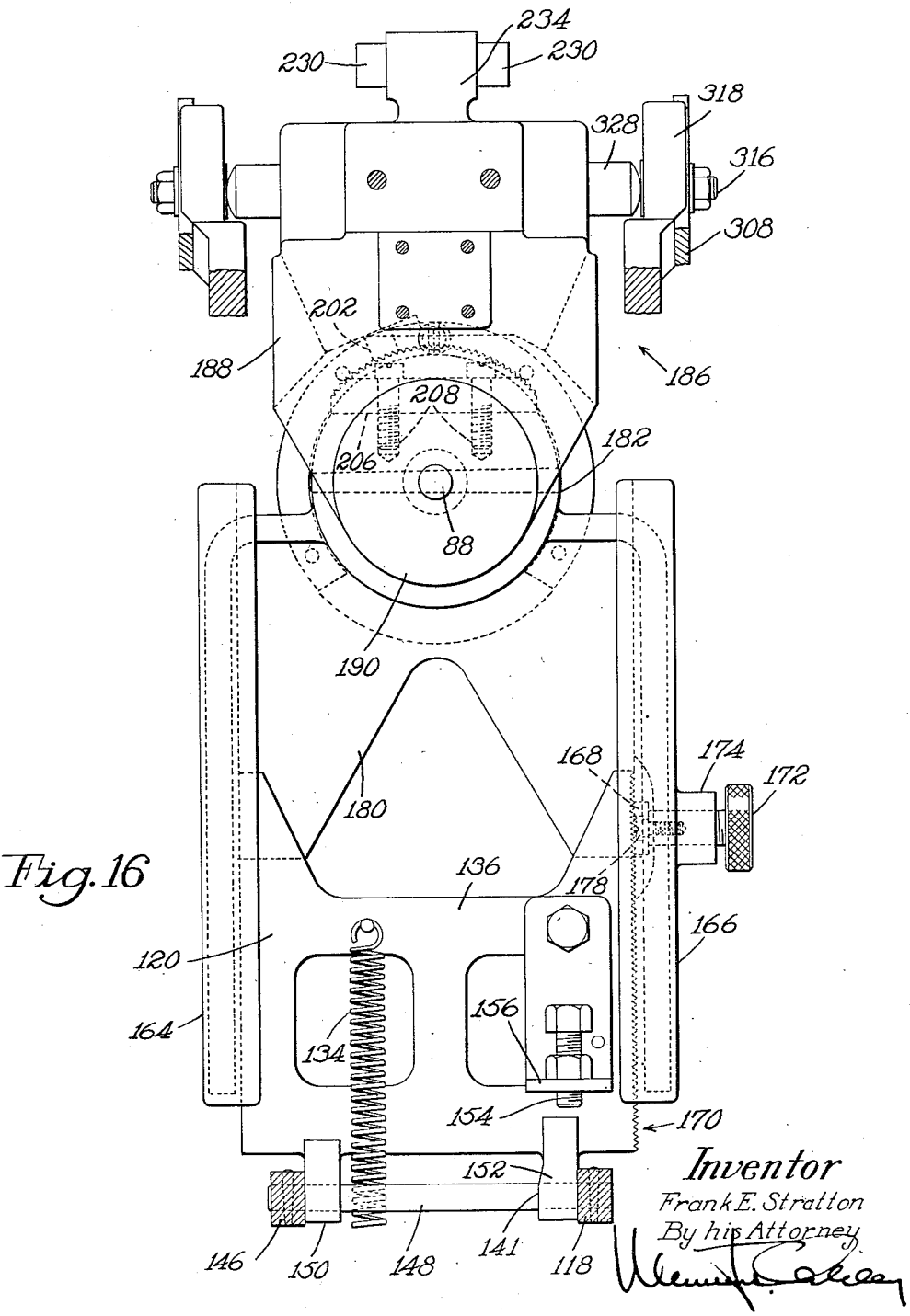
Fig. 16 is a plan view of the work supporting assembly.

When the last 82 is mounted on the last pin 88 the upper 84 is loosely mounted thereon and while the work support is in its rest position the upper is tensioned lengthwise on the last by the operation of a toe gripper incorporated in the work supporting assembly. The illustrated gripper comprises a jaw 98 (Fig. 11) constructed and arranged to engage the outer surface of the upper and a jaw 100 constructed and arranged to engage the lining. The gripper jaw 100 is positioned between the parallel arms of a lever 102 and rigidly secured thereto and the gripper jaw 98 is pivotally mounted on a crosspin 104 mounted in the parallel arms of the lever. The jaw 98 has an arcuate tail portion 106 extending upwardly from its gripping end portion and positioned between two cross pins 108 and 110 mounted in parallel horizontal arms 112 comprising the rear end portion of a bent lever positioned between the parallel arms of the lever 102 and fulcrumed on a cross pin 114 mounted in the lever. The parallel arms 112 project rearwardly from a crosshead 113 (Fig. 1) which is an integral part of two parallel angular portions 124 comprising the central section of the lever. The pins 108 and 110 are so disposed relatively to the tail portion 106 of the gripper jaw 98 that upon upward swinging movement of the lever 112 the pin 110 acts on the concave surface of the tail portion to swing the jaw in a counterclockwise direction, as seen in Fig. 11, in order to cause the lasting margin at the toe end of the upper to be gripped between the gripper jaws. Conversely, downward swinging movement of the lever 112 causes the pin 108 to act on the convex side of the tail 106 thereby swinging the jaw 98 in a clockwise direction to disengage it from the upper. The lever 102 is pivotally mounted on a horizontal pin 116 projecting widthwise of the shoe to the left, as seen in front elevation from the upper end portion of an arm 118 which forms, in conjunction with a short vertical arm 146 (Fig. 1) and a crossbar 144, the means for supporting the toe gripper assembly. Referring to Fig. 9, the arms 118 and 146 are fixed to opposite end portions of a cross pin 148 journalled in parallel lugs 150 and 152 projecting forwardly from a carrier or slide 120 (Fig. 2) which is mounted in a structure hereinafter described for movement lengthwise of a shoe in the machine to adjust the position of the toe gripper assembly in accordance with the size of the shoe to be operated upon. For holding the gripper jaws in gripping engagement with the lasting margin of the upper a pawl 122 (Fig. 11) is positioned between the parallel angular portions 124 comprising the central section of the lever 112 and is pivotally mounted on a crosspin 126 extending between the parallel portions 124. The forward portion of the lever 112 is in the form of a handle 128 formed integrally with the parallel portions 124. The pawl 122 is urged in a counterclockwise direction, as seen in Fig. 11, by a spring 130 mounted in a bore in the handle 128. The spring 130 brings the pawl into engagement with ratchet teeth formed in the convex edge face of an arcuate arm 132 fixed to the lever 102. During the swinging movement of the lever 112 to close the gripper jaws on the lasting margin of the upper, the lever 102 is yieldingly held against movement by a spring 134 the forward end of which is anchored to a pin carried by the lever 102 and the rear end of which, as shown in Fig. 1, is anchored to a pin projecting upwardly from a crossbar 136 in the slide 120. Further movement of the handle 128 after the grippers have been closed on the lasting margin of the upper causes the entire gripper assembly to swing as a unit in a clockwise direction, as seen in Fig. 11, on the pin 116 in order to impart toeward tension to the upper. It will be understood that such movement of the gripper assembly stretches the spring 134. The tension so imparted to the upper is maintained by a pawl 138 which cooperates with ratchet teeth 140 formed in the right side face of the lower portion of the arcuate arm 132. Referring to Fig. 9, the pawl 138 is pivotally mounted on a pin 142 extending downwardly from the crossbar 144. The gripper assembly is normally held in its position shown in Fig. 11 by the spring 134 which holds the crossbar 144 against the head of an abutment screw 154 mounted in an arm 156 projecting upwardly from the slide 120. In order to provide clearance for the mounting of a last with an upper assembled thereon on the last pin 88 and the removal thereof from the last pin after the operations of the machine have been completed, the toe gripper assembly can be manually swung forwardly into a position determined by the engagement of the notched downward extension 158 of the arms 118 and 146 with the forward edge face of the slide 120. The forward movement of the toe gripper assembly to provide clearance for the removal of the shoe from the machine after the operations of the machine have been completed is employed to cause the pawl 138 (Fig. 9) to be disengaged from the ratchet teeth 140 in the arm 132 in order to permit the spring 134 to return the gripper assembly to its normal rest position illustrated in Fig. 2. To this end the pawl 138 is provided with a rearwardly extending arm 139, the free end of which is rounded for engagement with a cam surface 141 formed in the lug 152 projecting forwardly from the right side of the slide 120. The engagement of the rounded end of the arm 139 with the cam surface 141 causes the pawl to rotate in a counterclockwise direction, as seen in Fig. 9, thereby disengaging it from the ratchet teeth 140 and freeing the lever 102 and the parts mounted thereon for movement by the spring 134 (Fig. 11) to its normal rest position. When the arm 118 is swung back into its upright position the rounded end of the arm 139 moves rearwardly from the cam surface 141 and a spring 143 acting on a laterally extending tail portion 145 of the pawl returns the pawl to ratchet engaging position. In the illustrated organization the upward pull exerted on the extremity of the toe portion of the upper by the gripper jaws 98 and 100 is taken by a roll 160 (Fig. 11) mounted on a pin 162 fixed in and projecting to the left from the arm 118. The roll is eccentrically mounted on the pin to provide for adjustment thereof in accordance with the position of the toe portion of the last bottom and the roll is secured in adjusted position on the pin 162 by a set screw mounted in the hub of the roll. In the illustrated organization the slide 120 is mounted in grooves in parallel arms 164 and 166 (Fig. 16) and is held in adjusted position in said arms by a detent 168 (Fig. 8) constructed and arranged to engage teeth 170 (Fig. 16) formed in the right-hand margin of the slide. The illustrated detent is a rectangular member mounted in a suitable recess in the arm 166. For advancing and retracting the detent a knurled thumbscrew 172 is mounted in a threaded bore in a boss 174 projecting outwardly from the arm 166. As shown in Fig. 8, the screw 172 has fixed in its inner end a headed screw 178 constructed and arranged to rotate in a counterbored hole in the detent 168. Referring to Figs. 6 and 16, the arms 164 and 166 are connected by a web 180 which extends forwardly from a cylindrical head 182 mounted on the upper portion of the piston rod 72 and secured thereto by a pin 184 shown in Fig. 11.

Figure 15:
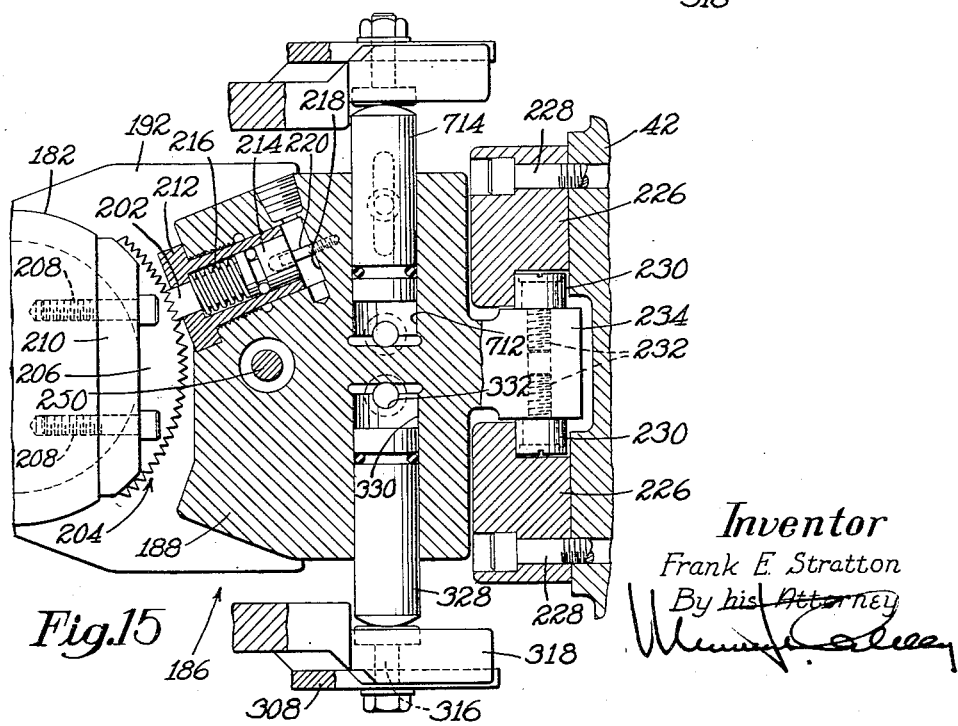
Fig. 15 is a section on the line XV—XV of Fig. 11 taken on the same scale as Fig. 14.

In order to provide means for securing the work supporting assembly with the last and upper thereon correctly oriented with relation to the wiping and tacking instrumentalities a head 186 (Fig. 11) is swiveled on the piston rod 72 and means is provided for holding the head against angular movement relatively to the vertical section 42 of the front plate of the machine frame and means is provided for holding the head 182 against angular movement relatively to the head 186. The head 186 comprises a body portion 188 having a forwardly extending portion 190 which overlies the head 182 and a similar forwardly extending portion 192 which underlies the head 182. The head 186 is held against downward movement by a suitable ball bearing 194 the inner race of which is mounted on the reduced upper end portion of the piston rod 72 and the outer race of which is mounted in a recess in the base of the forwardly extending portion 190. The last pin 88 projects upwardly from the reduced upper end portion of the piston rod 72 through a bore in the forwardly extending portion 190 which bore provides clearance for the angular movement of the work supporting assembly relatively to the head 186. The head 186 is held against upward movement on the piston rod 72 by a suitable ball bearing 196 the outer race of which is mounted in a counterbore in the top of the forwardly extending portion 192 of the head and the inner race of which bears against a boss 198 projecting downwardly from the head 182. When the machine is at rest the assembly comprising the head 182 and the head 186 and the mechanisms mounted thereon are supported against movement longitudinally of the piston rod 72 by the engagement of an annular boss 200 with the upper race of the thrust bearing 92. Referring to Fig. 15, the head 182 is held against angular movement relatively to the head 186 by a locking bolt comprising a plunger 202 having parallel teeth formed in its forward end portion and arranged to register with teeth 204 formed in the arcuate rear face of a plate 206. To provide for the attachment of the plate 206 to the head 182 the rear portion of the head is slabbed off to provide a plane surface against which is located the forward plane surface of the plate 206. The plate is attached to the head by two headed screws 208 projecting through suitable bores in a flange 210 projecting upwardly from the plate 206 and into tapped bores in the head 182. The forward portion of the plunger 202 is mounted in a bore in a screw plug 212 mounted in the head 186 and the plug is counterbored to provide for sliding engagement therein of a head 214 at the rear end of the plunger 202. The plunger is yieldingly held in its retracted position by a spring 216 surrounding the plunger and confined between the base of the counterbore and the head 214. The plunger is advanced into locking position by pressure fluid which enters the head 186 through a port 218 and acts against the head of the plunger. The plunger 202 is held against rotary movement in the plug by a spline 220 mounted in the head 186 and arranged to operate in a suitable splineway in the head 214. When the machine is at rest the head 186 is yieldingly held against angular movement relatively to the cylinder 46 by a spring pressed detent 222 (Fig. 11) carried by and extending downwardly from the head 186 and arranged to be seated in a groove 224 formed in the head 76 of the cylinder 46. When the work supporting assembly is in its elevated position (shown in Fig. 11) the head 186 is held against angular movement by two plates 226 (Fig. 15) secured by headed screws 228 to the vertical section 42 of the front plate of the machine frame. The plates 226 are rabbeted, as shown in Fig. 15, to receive two rolls 230 pivotally mounted on headed screws 232 mounted in and projecting in opposite directions from a boss 234 projecting rearwardly from the head 186. To facilitate the entrance of the rolls 230 into their position shown in Fig. 11 in which they are in engagement with the rabbeted portions of the plates 226, the roll engaging surfaces of the rabbeted portions are constructed at their lower portions 236 to diverge downwardly relatively to the plate 42. It will be seen that the plates 226 not only determine the angular disposition of the head 186 relatively to the vertical section 42 of the front plate of the machine frame but also determine the position of the shoe lengthwise thereof relatively to the wiping and tacking instrumentalities.

For holding the heel end portion of the last against upward movement relatively to the work supporting assembly the illustrated machine is provided with a holddown constructed and arranged to engage the heel end portion of the insole 86 on the last bottom. The illustrated holddown is an arm 238 (Fig. 11) having an insole engaging head 240 and a shank portion 242 which is arched to provide clearance for the wiping operation on the back line portion of the lasting margin of the upper. Formed in the rear portion of the holddown arm is a tail 244 which extends downwardly from the shank portion 242 and has a plane rear face constructed and arranged to engage the plane forward face surface of an upwardly extending bracket 246 carried by the head 186. The lower portion of the tail 244 is mounted in a bifurcated head 248 at the upper end of a piston rod 250 and is pivoted on a cross pin 252 mounted in the head 248. The holddown is constantly urged in a clockwise direction, as seen in Fig. 11, by a torsion spring 254 (Fig. 14) surrounding the cross pin 252 and having one end anchored in the head 248 and the other end arranged to engage the tail portion of the holddown. When the machine is at rest the holddown is elevated and swung upwardly into its position shown in Fig. 2. The holddown is moved downwardly from its position in Fig. 2 to its position illustrated in Fig. 11 by fluid pressure acting on the upper portion of a head 253 mounted on the lower end portion of the piston rod 250 and slidably mounted in a bore in the head 186. During the downward movement of the holddown it is swung in a counterclockwise direction by its engagement with the angular base 254 of a notch at the upper end of the bracket 246. During the downward movement of the holddown an extension of the pin 252 enters a vertical groove 256 in a forward extension 258 of the bracket 246 and the opposite end of the cross pin 252 enters a vertical groove in a similar extension of the bracket (not shown) at the right side of the holddown. Thus the piston rod is held against possible springing action in a forward direction as the holddown is swung downwardly at the beginning of its downward movement. The engagement of the cross pin in said grooves also serves to determine the orientation of the holddown so that it registers correctly with the heel seat portion of the insole and with an abutment member herein illustrated as a vertical rod 260 the rounded lower end of which registers with a shallow recess 294 (Fig. 14) formed in the upper surface of the head 240 of the holddown.

Figure 14:
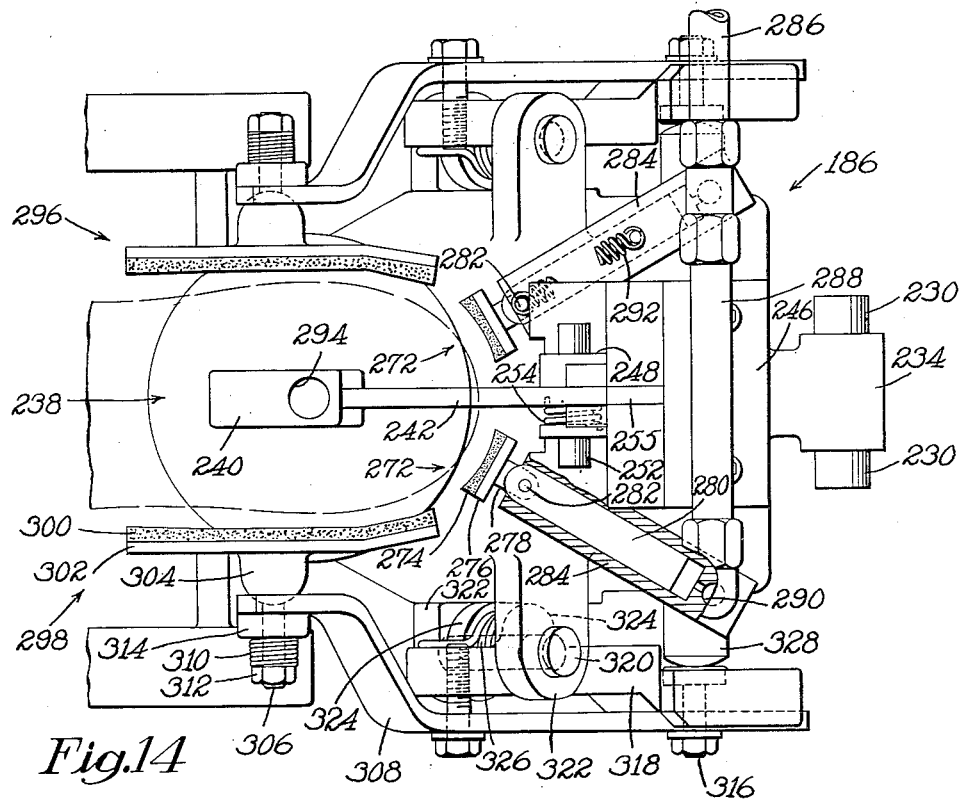
Fig. 14 is a plan view, greatly enlarged, illustrating mechanism for clamping the heel end portion of the upper against the last.

Referring to Fig. 14, the illustrated work supporting assembly includes a pair of heel end clamping members or pressers 272 constructed and arranged to engage the upper adjacent to and at opposite sides of the back line thereof and to clamp the upper against the last so as to hold the back line portion of the upper against displacement during the subsequent operations of the machine. The presser members are substantially identical in construction and the following description which refers in part to one presser and in part to the other will be understood to be applicable to both. Each presser member comprises an upper engaging pad 274 the work engaging portion of which is substantially complemental in contour to that portion of the upper which it engages. The pad is fixed to a head 276 from which projects a stem 278 the rear end portion of which is mounted in an open ended slot in a plunger 280 and pivoted for swinging movement generally widthwise of a last in the machine on a pin 282 mounted in the plunger. The plunger is mounted in a cylinder 284 fixed to the head 186. The cylinder 284 is so oriented that its axis coincides substantially with an extension of the radius of curvature of that portion of the upper on which the pad operates. The plunger is advanced from its retracted position shown in Fig. 14 to its advanced position in which the pad is in engagement with the upper by pressure fluid conducted through a flexible tube 286 and a rigid tube 288 to a port 290 at the rear end of the cylinder 284. For returning the plunger to its retracted position a spring 292 is anchored at its rear end to a pin projecting upwardly from the cylinder 284 and at its forward end to an upward extension of the pin 282. The presser members are advanced while the work supporting assembly is in its rest position shown in Fig. 1 and the operation of said members occurs substantially concomitantly with the operation of the holddown 238 and the bolt 202.

For securing the upper materials at opposite sides of the heel end portion of the last against displacement after the performance of the manual operations at the breast line portion of the upper, two clamping members herein illustrated as presser pads 296 and 298 are constructed and arranged to engage the outer surface of the upper and to apply pressure thereto widthwise of the last in order to clamp the upper materials against the last and to hold them so clamped during the remaining operations on the upper. The presser pads are carried by the head 186 and are actuated independently of each other while the work supporting assembly is in its forwardly inclined position illustrated in Fig. 2. Referring to Fig. 14 the presser pad 298 comprises a resilient rubber member 300 made of relatively thick sheet material and adhesively attached to a bent plate 302 which is oriented to position the rubber member 300 for clamping engagement with the outer surface of the upper. Mounted on the plate 302 and projecting outwardly therefrom is a generally hemispherical boss 304 from which projects a stem 306. The stem 306 extends through an opening in a resilient bent arm 308 which opening is larger than the diameter of the stem to an extent sufficient to permit limited angular movement of the presser pad for self-adjustment thereof to the contour of that portion of the upper against which it operates. The boss 304 is mounted in a shallow socket in the arm 308 and frictionally held in adjusted position in the socket by the pressure of a spring 310 surrounding the stem 306 and confined between a nut 312 on the threaded end of the stem and a boss 314 on the arm 308. The resilient arm 308 has its forward portion inwardly offset relatively to the rear portion of the arm in order to position the presser pad for engagement with the upper and the rear portion is secured by a bolt 316 to the outwardly offset rear end portion of a lever 318. The lever 318 is fulcrumed on a pin 320 which is fixed in parallel lugs 322 projecting outwardly from the head 186. The lever 318 is positioned between the lugs 322 and has lugs 324 projecting inwardly from the lever and bored to receive the pin 320. The lever is urged in a counterclockwise direction, as seen in Fig. 14, by a torsion spring 326 having one end anchored in the lowermost of the two lugs 322 and the other end anchored in the uppermost of the two lugs 324. For swinging the lever 318 in a clockwise direction, as seen in Fig. 14, to bring the presser pad 298 into clamping engagement with the upper a plunger 328 (Fig. 15) is slidably mounted in a bore 330 in the head 186 which is so arranged that the rounded outer end of the plunger engages the head of the bolt 316. The plunger is advanced by fluid pressure which is conducted to the inner extremity of the bore 330 through a port 332 in the lower portion of the head 186. After the plunger 328 is advanced the pressure in the bore 330 is maintained during the remainder of the machine cycle in order to hold the upper clamped against the last during the lasting and tack driving operations. The mechanism for mounting and operating the presser pad 296 at the left side of the shoe is substantially identical to the mechanism above described for mounting the presser pad 298 and will be understood from the foregoing description.

Upon the completion of the manual operations at the breast line portion of the shoe the work supporting assembly is swung rearwardly from its forwardly inclined position illustrated in Fig. 2 by fluid pressure conducted by a flexible tube 334 to a port in the rear portion of a cylinder 336 pivotally connected at its forward end to the cylinder 46. Mounted in the cylinder 336 is a piston 338 having a piston rod 340 extending to the right therefrom as seen in Fig. 2 through a head 342 at the right end of the cylinder 336 and having its rear end pivotally mounted on a pin 344 fixed in the left side plate 36 of the head frame 32. It will be seen that inasmuch as the piston 338 is held against movement longitudinally of the piston rod fluid pressure entering the cylinder 336 acts against the head 342 of the cylinder to move the cylinder and the work supporting assembly to the right as seen in Fig. 2. The piston 338 and the cylinder 336 also operate as a valve to open a pressure line from the cylinder 336 to the cylinder 46. To provide for the pivotal mounting of the cylinder 336 on the cylinder 46 of the work supporting assembly the cylinder 336 has a head 346 at its left end as seen in Fig. 2 and projecting laterally to the right from said head is a cylindrical boss 348 (Fig. 1) which is in axial alinement with a similar boss 350 projecting to the left from the upper portion of the cylinder 46. Fixed in the boss 350 and projecting axially therefrom is a pin (not shown) which is journaled in an axial bore in the boss 348. Referring to Fig. 11, the rearward swinging movement of the work supporting assembly by the application of fluid pressure to the cylinder 336 is arrested by the engagement of the rolls 230 carried by the head 186 with a land 352 on the vertical section 42 of the front plate 38 of the head frame. The rolls 230 come into contact with the land 352 at its lower extremity below the level of the lower ends 354 of the flanges formed in the plates 226. Upon the completion of the rearward movement of the work supporting assembly fluid pressure is brought to bear on the base of the piston head 70 to elevate the work supporting assembly into its position shown in Fig. 11, said position being determined by the engagement of the recessed portion of the head 240 of the holddown 238 with the rounded lower end portion of the abutment rod 260.

For wiping the lasting margin of the back line portion of the upper over the insole on the last bottom and for holding the lasting margin overwiped while fastening herein illustrated as tacks, are driven to secure the lasting margin in overwiped position, the illustrated machine is provided with a back line wiper 356 the lower portion of which is bifurcated, as shown in Fig. 13, to straddle the shank portion 242 of the holddown 238. For wiping the lasting margin at opposite sides of the breast line portion of the upper inwardly over the insole and holding it in lasted position while fastening are driven, the illustrated machine is provided with breast line wipers 358 and 360 (Fig. 6) positioned at opposite sides of the breast line portion of the shoe for operative movement widthwise of the shoe. Referring to Figs. 2 and 11, the illustrated back line wiper comprises a pair of vertical plates 362 the rear portions of which are offset downwardly to provide abutments for arresting the overwiping movement of the wiper plates by engagement with the feather line portion of the upper at opposite sides of the back line. The wiper plates 362 are secured by headed screws 364 to a wiper carrier 366. The wiper carrier is pivotally mounted at the lower end of a wiper operating lever 368 and its angular disposition is determined by a tack driver lever 370 as hereinafter described. Referring to Fig. 6, the illustrated wiper lever comprises two arms each having a hub 372 at its upper end fixed to a pin 374 journaled in a lug 376 projecting downwardly from the forward portion of an arm 378 (Fig. 5). The lower portions of the arms comprising the wiper lever 368 converge downwardly, as shown in Fig. 6, to the point where they engage the opposite side faces of the wiper carrier 366. Referring to Fig. 5 the arm 378 is pivotally mounted between lugs 380 projecting downwardly from a member 382 secured by headed screws 384 to a plate 386 comprising the top of the housing 34. The arm 378 is urged upwardly by a spring 388 the lower end of which is anchored to the free end of the arm and the upper end to the head of a bolt 390 fixed to the plate 386. The spring 388 holds the arm 378 in contact with the lower end of a threaded pin 392 mounted in a threaded axial bore in a worm gear 394 which is held against vertical movement by a boss 396 projecting downwardly from the plate 386 and an arm 398 projecting forwardly from the member 382. The arm 398 and the boss 396 are drilled to receive the threaded pin 392. In order to hold the pin against rotation a headed screw 400 is mounted in the boss 396 and has its reduced end portion seated in a longitudinal groove in the pin. It will be seen that rotation of the worm gear 394 effects vertical movement of the threaded pin 392 thus varying the angular position of the arm 378, and imparting adjustive movement heightwise of a shoe in the machine to the back line wipers 362. To provide for the convenient operation of the worm gear 394 a worm 402 is fixed to the inner end portion of a shaft 404 and arranged to mesh with the worm gear 394, the shaft being journaled in an elongated boss 406 (Fig. 7) projecting inwardly to the left from the right side wall of the housing 34. A handle 408 fixed to the right end portion of the shaft 404 projecting outwardly beyond the housing provides a convenient means for the manual operation of the worm 402. In order to permit the back line wipers 362 to yield upwardly as required during the overwiping operation the connections between the arms of the wiper lever 368 and the wiper carrier 366 comprise a short vertical slot 410 formed in a rearward extension 412 of the wiper carrier and a cross pin 414 fixed in the lower end portions of the arms 368 and extending through the slot. For applying wiping pressure to the back line wipers 362 a spring 416 (Fig. 5) has its lower end seated in a socket in the extension 412 and has its upper end seated in a socket in a crosshead 418 connecting the lower portions of the arms of the wiper lever 368. For advancing the back line wipers to wipe the lasting margin of the upper inwardly over the insole on the last bottom, a piston 420 is mounted in a cylinder 422 fixed to and projecting rearwardly from the vertical section 42 of the front plate 38 of the head frame. The rod 424 of the piston 420 projects forwardly through a stuffing box 426 fixed to the head of the cylinder 422 and has at its forward end a discoidal head 428 the margin of which is tapered for operation in a vertical channel formed in a rearward extension of the crosshead 418, the head 428 being held against horizontal movement relatively to the crosshead 418 by the base of the channel and by inwardly extending flanges 430 constructed and arranged to engage the rear face of the head 428.

The breast line wipers 358 and 360 (Fig. 6) are mounted at the lower ends of two levers 432 and 434 which are pivotally mounted at their upper ends on shafts 436 and 438. The construction and operation of the breast line wiper assemblies are substantially identical and the following description of the construction and operation of the right-hand wiper assembly will be understood to apply equally well to the left-hand assembly. Referring to Fig. 5, the lever 434 comprises a pair of parallel arms projecting downwardly with a forward inclination from a common hub 444. At their lower ends the arms are connected by a crosshead 446 (Fig. 6) which has attached thereto a channel member 448 having its channel disposed horizontally. For advancing and retracting the breast line wiper 360 a piston 450 on a piston rod 452 is mounted in a cylinder 454 secured to the edge face of an annular boss 456 projecting inwardly from the side plate 36 of the head frame, the cylinder being secured to the boss by headed screws 458 extending through a flange 460 at the inner end of the cylinder 454. The piston rod 452 is mounted in a gland or stuffing box 462 fixed to the cylinder. The piston is moved to the left, as seen in Fig. 6, to advance the breast line wiper 360 by pressure fluid entering the cylinder 454 through a port 464 and is moved to the right to retract the breast line wiper by pressure fluid entering the cylinder through a port (not shown) in the left end portion of the cylinder. To provide a connection between the piston rod 452 and the channel member 448 the piston rod has a discoidal head 466 mounted in the channel of the member 448 and having its marginal portion tapered to provide clearance for the angular movements of the channel member relatively to the head. During the movement of the piston to the right, as seen in Fig. 6, the head 466 acts against flanges 468 and 470 projecting, respectively, downwardly and upwardly from the channel member. The illustrated breast line wiper 360 comprises a wiper plate 474 arranged in a generally vertical position and secured by two bolts 476 to a wiper carrier 478. To provide for the mounting of the carrier on the wiper lever 434 an ear 480 projecting to the right from the body portion of the carrier is slotted to receive a cross pin 482 mounted in the parallel arms of the lever 434 at their lower extremities. The right side portion of the wiper plate 474 is extended downwardly beyond the left side portion to provide an abutment surface for limiting the overwiping movement of the wiper plate. In order to impart downward or wiping pressure to the wiper plate a spring 484 is interposed between the crosshead 446 and the ear 480.

In order to provide for adjustment of the breast line wipers 358 and 360 lengthwise of a shoe in the machine for operation on shoes of different sizes the hub 444 (Fig. 5) at the upper end of the wiper lever 434 is slidably mounted on the horizontal shaft 438 and the hub 492 at the upper end of the wiper lever 432 is mounted on the shaft 436 (Fig. 7). The shafts 438 and 436 are arranged parallel to each other and mounted in bosses 490 projecting inwardly from the housing 34. For concomitantly and uniformly moving the hubs 444 and 492 forwardly or rearwardly on the shafts 438 and 436, respectively, the illustrated machine is provided with a shifter comprising a crosshead 494 having at its opposite ends yokes 496 and 498. The yoke 496 is mounted slidably on the shaft 436 and arranged to engage opposite end faces of the hub 492 and similarly the yoke 498 is slidably mounted on the shaft 438 and arranged to engage opposite end faces of the hub 444. To provide for the convenient operation of the shifter a hand screw 500 is journaled in a cylindrical bearing member 502 projecting rearwardly from the front of the housing 34 and has threaded engagement in a lug 504 (Fig. 3) projecting downwardly from the cross member 494 of the shifter. Fixed to the forward end portion of the screw 500 is a hand wheel 506 and fixed to the central portion of the screw is a collar 508 for preventing movement of the screw to the left, as seen in Fig. 3.

The angular disposition of the breast line wiper 360, as seen in Fig. 5, is determined by a tack driver lever 510 which has a ball-and-socket connection to the upper end of a tack driver bar 512 mounted in a bore in an upward extension of the wiper carrier 478. It will be understood that the angular disposition of the wiper 360 will be altered by the adjustment of the wiper operating lever 434 as above described. In order to provide for such angular movement of the wiper carrier 478 the ear 480 of the wiper carrier has convex front and rear surfaces, as shown in Fig. 5.

For actuating the tack driver lever 370 to drive two tacks through the overlasted margin of the upper and through the insole to secure the back line portion of the upper in overlasted position a spring 514 is anchored at its rear end to an arm 516 projecting upwardly and rearwardly from the hub portion of the tack driver lever and at its forward end in an eye in the head of a bolt 518 mounted in a crosshead 520 connecting the two rearmost bosses 490. Similarly two tack driver springs are provided for actuating the drivers which drive tacks through the overlasted margin of the upper and the insole at opposite sides of the breast line portion of the upper, one of these springs being identified in Fig. 5 by the numeral 515. The three tack driver springs are loaded by the operation of three pistons, respectively, mounted in three vertical bores in a block 526 fixed to a vertical crosshead 528 connecting the side plates 36 of the head frame. In Fig. 5 a piston for loading the tack driver spring 515 is illustrated, said piston comprising a head 522 and an upwardly extending piston rod 524. The connections between the piston rod and the tack driver lever 510 comprise a triangular head 530 fixed to the upper end of the piston rod and a link 532 pivotally mounted in the upper portion of the head 530 and extending upwardly therefrom to the rear end of the tack driver lever. The upper portion of the link has formed therein a right-angular slot 534 through which extends a pin 536 mounted in the rear portion of the tack driver lever. During the downward movement of the piston to load the tack driver spring 515 the pin 536 is seated at the extremity of the horizontal portion of the slot 534 and is yieldingly held in this position by the tension of a spring 538 the upper end of which is anchored to an arm 540 extending rearwardly with an upward inclination from the lower extremity of the link 532 and anchored at its lower end to the rear end portion of the head 530. It will be understood that the spring 515 actuates the tack driver lever 510 when the link 532 is swung forwardly to bring the vertical portion of the slot 534 into alinement with the pin 536. In the illustrated organization such forward movement of the link 532 is effected during the initial stage of the upward movement of the piston 524. The upward movement of the piston brings an inclined surface at the forward end of an arm 542 projecting forwardly from the lower portion of the link 532 into engagement with a latch member 544 which offers sufficient resistance to the upward movement of the arm to cause the link to swing forwardly sufficiently to bring the vertical portion of the slot 534 into alinement with the pin 536. The latch member 544 is a cylindrical element having latch surfaces formed in its rear portion and bored from its forward end for the greater part of its length to receive a latch spring 546. The latch member is slidably mounted in a bore in an elongated boss 548 projecting rearwardly from the vertical section 42 of the front plate of the head frame. For holding the latch member 544 against rotary movement and for limiting its rectilinear movement a screw 550 is mounted in the boss 548 and has its reduced end portion positioned in a slot in the latch member. The forward end of the spring 546 is seated in a socket in the rear end of a slide 552 mounted in the forward portion of the bore in the boss 548 and the slide is movable in the bore to vary the pressure of the spring 546 by adjusting an abutment screw 554 against which the forward end of the slide is seated.

In order to provide a pocket for receiving tacks preparatory to the driving operation, the wiper member 362 (Fig. 12) has two plates 558 and 560 secured thereto by a bolt 562. Each of said plates is grooved horizontally at opposite sides of its lower end portion to receive the shank portions of two members 564 having heads 566 which are extended laterally to meet at the axis of the tack driving pin 569 (Fig. 13) and have their contiguous surfaces suitably recessed to provide a tack pocket. The heads 566 are yieldingly held in mutually contacting position by a torsion spring 568 having rectilinear legs mounted in grooves in the members 564. It will be understood that the heads 566 are separated by the advancement of the tack driving pin to permit a tack mounted in the tack pocket to be driven.

In order to prevent unintentional release of the tack driver springs by inadvertent manipulation of the arm 516 or one of its two companion arms, the illustrated machine is provided with means for positively holding the piston rod 524 (Fig. 5) and its companion piston rods (not shown) against upward movement. In the illustrated organization the locking mechanism comprises a headed plunger 570 mounted in a horizontal bore in the block 526 which communicates with the bore in which the piston 522 is mounted. As long as hydraulic pressure is maintained in the machine the plunger 570 is held retracted as shown in Fig. 5, by fluid pressure entering the block 526 through a port 572. When the fluid pressure in the system is released a spring 574 mounted in a socket in the head of the plunger 570 and confined between the plunger and a plug 576 expands to advance the tapered end portion of the plunger into a peripheral groove 578 in the piston 522, thus locking the piston against vertical movement. The plunger remains in locking position until hydraulic pressure comes on again when pressure fluid entering the port 572 moves the plunger 570 to the right, withdrawing it from the groove in the piston 522.

Inasmuch as there is no provision in the illustrated machine for adjustment of the three lasting wipers as a unit heightwise of the shoe, means is provided for adjusting the position of the shoe itself heightwise thereof in accordance with variations in the thickness of the overlasted materials. In the illustrated organization the position of the shoe heightwise thereof is determined by the abutment rod 260 which, it will be remembered, limits the upward movement of the shoe and its supporting assembly by the engagement therewith of the holddown arm 238, as shown in Fig. 11. Accordingly, the adjustment of the position of the shoe heightwise thereof is effected by a vertical adjustment of the abutment rod 260. To this end the upper portion of the abutment rod 260, as shown in Fig. 6, is threaded for engagement in a threaded axial bore in a worm gear 573 which is held against vertical movement between the lower end of a hollow boss 575 extending downwardly from the top plate 386 of the housing 34 and parallel ears 577 projecting rearwardly from the front wall of the housing. For rotating the worm gear 573 in order to adjust the vertical position of the abutment rod a worm shaft 579 is mounted in a bearing in the front wall of the housing and has fixed thereto a worm 581 arranged to mesh with the worm gear. To provide for manual rotation of the worm shaft a knob 583 (Fig. 1) is fixed to that portion of the shaft projecting forwardly from the housing.

Figure 17:
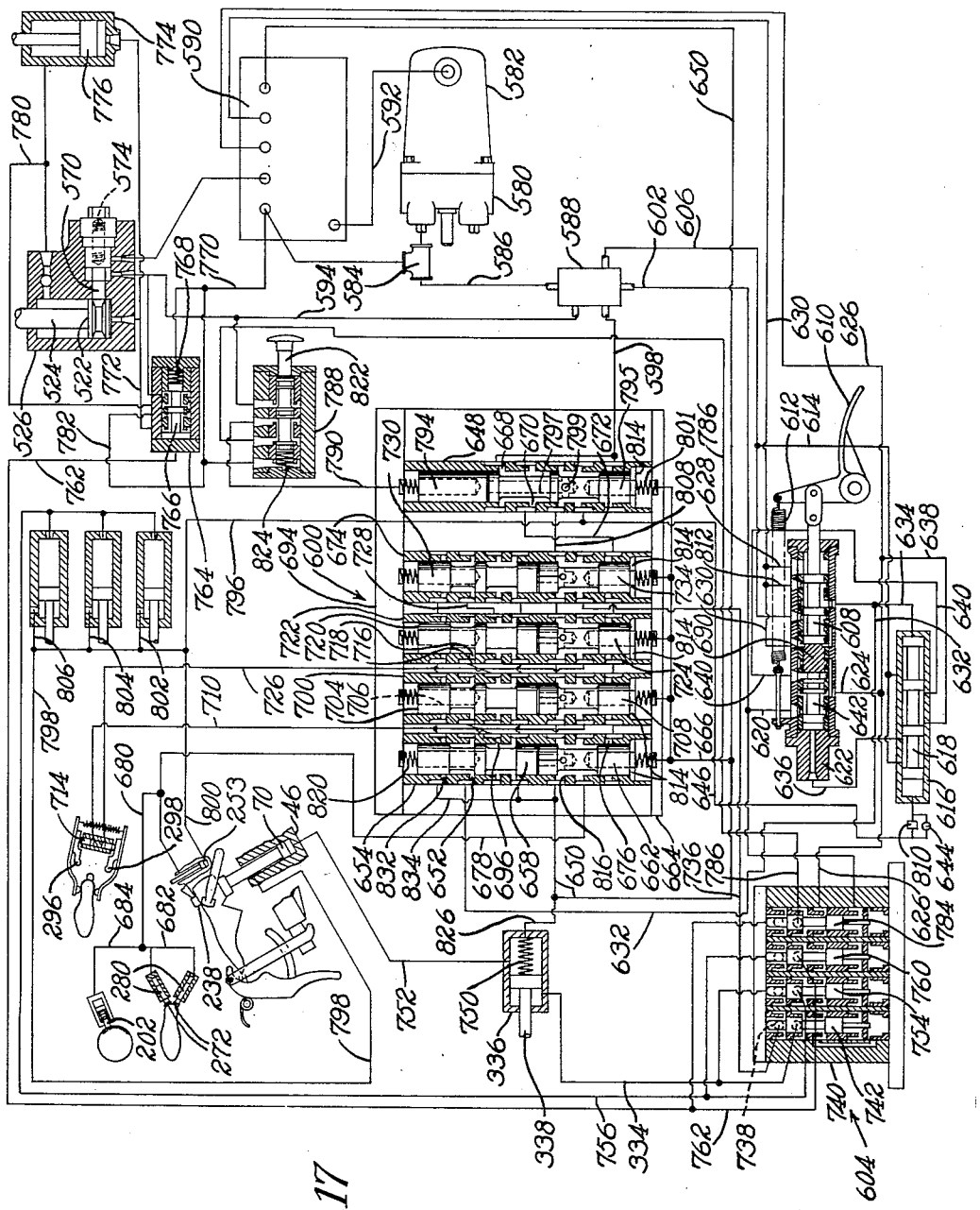
Fig. 17 is a diagram of the hydraulic operating mechanism.

The power operated instrumentalities of the illustrated machine are operated by pressure fluid transmitted by a pump 580 (Fig. 17) which draws fluid from a closed chamber 582 in the form of a casting attached to the casing of the pump and transmits fluid under pressure through a relief valve 584 and a main line 586 to a manifold 588. The chamber 582 is kept full at all times by the flow of fluid by gravity from a tank 590 through a pipe 592, the tank being supplied by the exhaust from the hydraulic system. Pressure fluid is transmitted from the manifold 588 through a pressure line 594 to the block 526 which mounts the three pistons which energize the tack driving springs. A pressure line 598 from the manifold 588 transmits pressure fluid to a bank of selector valves 600 which control automatically the operations of certain instrumentalities of the machine. A pressure line 602 from the manifold 588 transmits pressure fluid to a bank of sequence valves 604 which automatically control the operations of other instrumentalities of the machine. A pressure line 606 from the manifold 588 transmits pressure fluid to spool valves 608 and 618. The spool valve 608 is moved to the right, as seen in Fig. 17, by the depression of a treadle 610 to initiate the hydraulic cycle of the machine and is moved to the left by a spring 612 to return it to its normal rest position illustrated in Fig. 17. A branch 614 of the pressure line 606, communicates with a cylinder 616 in which operates the control valve 618. When the pump 580 is operated with the machine at rest pressure fluid is circulated freely through the main line 586, the manifold 588, the pressure line 602 and a branch line 620 to the left end of a cylinder 622 and from the cylinder through a line 624 to an exhaust line 626 communicating with the tank 590.

The depression of the treadle 610 moves the spool valve 608 to the right, as seen in Fig. 17, discharging the fluid in the right end portion of the cylinder 622 into an exhaust line 628 communicating with an exhaust line 630. The movement of the spool valve 608 by the depression of the treadle brings the pressure line 606 into communication with a service line 632. Branching from the service line 632 is a line 634 which communicates with a port in the right end portion of the cylinder 616 in which is mounted the spool valve 618. When the machine is at rest the spool valve 618 is at the limit of its movement to the right and a line 636 extending from the left end of the cylinder 622 to the cylinder 616 is in communication with the line 614 connected to the pressure line 606. The movement of the spool valve 618 to the left by pressure fluid from the line 634 breaks the connection from the line 614 to the line 636 and brings the line 636 into communication with an exhaust line 638. The movement of the spool valve 618 to the left also serves to bring the line 614 into communication with a line 640 which communicates with a port in the cylinder 622 through which pressure is brought to bear against the right end of a spool valve 642 in the cylinder 622 moving said valve to the left and breaking the connection from the pressure line 620 to the exhaust line 624, thus closing the idle hydraulic circuit above described. During the movement of the spool valve 618 to the left fluid in the left end portion of the cylinder 616 is exhausted through a check valve 644 and a line 646 to a valve block 648 in the bank of valves 600 and thence from right to left through the bank of valves to an exhaust line 650. Upon the closing of the idle hydraulic circuit from the pressure line 620 through the cylinder 622 and the line 624 the pressure in the system builds up and flows through the service line 632 to a port 652 in a valve block 654 (Fig. 18) at the left end of the bank of valves 600. From the port 652 pressure fluid enters a chamber in the valve block 654 and flows through a port 656 in a spool valve 658 mounted in the valve block 654 and into an axial bore 660 in the upper portion of the spool valve. The spool valve 658 is one element of a quadruple valve assembly in the bank of valves 600. The pressure fluid from the service line 632 acts on the base of the bore 660 and on the annular upper end portion of the spool valve 658 to move the valve downwardly into its position shown in Fig. 20. During its downward movement the spool valve 658 serves as a motor to impart downward movement to a spool valve 662 mounted in the valve block 654 and located beneath the valve 658. The spool valve 662, together with the spool valve 658, comprise one of the four units which together comprise the quadruple valve assembly. The common downward movement of the two spool valves 658 and 662 is arrested by the engagement of the spool valve 662 with a plate 664 forming the base of the housing of the bank of valves 600. During the common downward movement of the two spool valves fluid in that portion of the valve block 654 beneath the spool valve 662 is exhausted through a line 666 communicating with the exhaust line 650 connected to the tank 590. Upon the completion of the common downward movement of the two spool valves pressure fluid from the line 598 (Fig. 17) enters the valve block 648 through a port 668 and flows from the valve block 648 through a port 670 and a line 672 to the lower portion of a valve block 674 and then from right to left through the quadruple valve assembly to a port 676 in the valve block 654. Inasmuch as the spool valve 662 is now at the limit of its downward movement, as shown in Fig. 20, pressure fluid entering the port 676 passes through the lower portion of the valve block 654 and through a port 677 to a service line 678 through which pressure fluid is transmitted to a piston 253 (Fig. 11) for operating the holddown arm 238. The service line 678 also transmits pressure fluid to plungers 280 (Fig. 14) for operating the presser pads 272 which grip the rear end portion of the upper against the last, and to the bolt 202 (Fig. 15) for locking the shoe against angular movement. The service line 678 communicates directly with the piston which operates the holddown arms 238 and through a line 680 and a line 682 with the plungers for operating the heel end pressers 272, and through the line 680 and a line 684 with the head of the locking bolt 202. In order to cause pressure fluid from the line 598 to be brought to bear against the base of the valve 658 the spool valve 662 is provided with a port 686 (Fig. 18) which communicates with an axial passage 688 extending to the upper extremity of the valve body. The fluid pressure exerted against the base of the valve body 658 does not cause upward movement of the valve during the first part of the hydraulic cycle because the fluid pressure against the top of the valve body augmented by the pressure of a spring 820 exceeds the pressure against the base of the valve body. Thus the valve body 658, in its position illustrated in Fig. 20, closes to pressure from the line 632 a line 698 extending from the first quadruple valve assembly to the second quadruple valve assembly and causes the machine to come to rest upon the completion of the operations of the holddown 238, the heel end pressers 272, and the locking bolt 202, and to remain at rest while the operator holds the treadle 610 depressed. After an inspection of the work the operator removes his foot from the treadle 610 to permit the spring 612 to swing the treadle in a counterclockwise direction, as seen in Fig. 17, thus moving the spool valve 608 to the left, the fluid between the left end of the spool valve and plug 690 in the cylinder 622 flowing through the exhaust line 630 and the line 628 to the right end of the cylinder 622. The movement of the spool valve 608 to the left brings the service line 632 into communication with the exhaust line 630 through the cylinder 622 and a line 812 and relieves the fluid pressure at the upper end of the spool valve 658. Thereupon pressure fluid bearing against the base of the spool valve 658 moves the valve upwardly. Inasmuch as the port 832 in the upper portion of the valve block 654 is constantly open to exhaust through a branch line 834 communicating with the exhaust line 650 it will be understood that the upward movement of the spool valve 658 by the pressure beneath it continues until the valve body reaches its position shown in Fig. 19, said position being determined by the engagement of the upper end of the valve body with a plate 694 which forms the top of the housing for the bank of valves 600. The fluid pressure between the upper spool valve 658 and the lower spool valve 662 holds the latter at the limit of its downward movement thus maintaining the connection between the pressure line 598 and the service line 678 whereby the holddown member 238 is held in its operating position, clamping pressure is maintained on the heel pads 272 and the bolt 202 is held in locking position.

The upward movement of the spool valve 658 brings the port 652 into communication with a port 696 in the valve block 654. The second depression of the treadle 610 again brings the service line 632 into communication with the pressure line 606 and thereupon pressure fluid flows through the service line 632 and the ports 652 and 696 and through the line 698 into a chamber in a valve block 700 which communicates with a port in the upper portion of a spool valve 704, which is identical with the spool valve 658, and through said port with an axial bore 706 in the spool valve 704. Thus fluid pressure is exerted against the base of the bore 706 and the annular upper end portion of the spool valve 704 to impart downward movement to the valve 704 and to a spool valve 708 mounted in the block 700 beneath the valve 704 and corresponding in its construction and operation to the spool valve 662 in the valve block 654. The downward movement of the spool valve 708 brings the pressure line 598 into communication with a service line 710 which transmits pressure fluid to a bore 712 (Fig. 15) in the block 188 thus actuating a plunger 714 to cause the presser member 296 (Fig. 14) at the left side of the shoe to clamp the upper, counter and lining against the last.

Upon the completion of the operation of the presser pad 296 the machine comes to rest and remains at rest until the operator releases the pressure of his foot on the treadle 610 and permits the spring 612 to return the treadle to its elevated position and to move the spool valve 608 to the left into its position shown in Fig. 17. Thereupon the spool valve 704 is moved upwardly into contact with the plate 694 by pressure fluid from the pressure line 598, this operation being identical with the upward movement of the spool valve 658 above described. Upon the completion of the upward movement of the spool valve 704, pressure fluid from the service line 632 is transmitted through the valves 658 and 704, a line 716 and a port 718 to a spool valve 720 at the upper end of a valve block 722. The spool valve 720 and a spool valve 724 positioned beneath it in the valve block 722 are moved downwardly by pressure fluid, this operation being identical with the downward movement of the spool valves 704 and 708 in the valve block 700 and the spool valves 658 and 662 in the valve block 654. The downward movement of the valves 720 and 724 brings the service line 726 into communication with the pressure line 598. The service line 726 communicates with a plunger 328 (Fig. 15) which actuates the pressure pad 298 (Fig. 14) to clamp the upper, counter and lining at the right side of the shoe against the last whereupon the machine again comes to rest.

After an inspection of the work the treadle 610 is again depressed to cause pressure fluid to be transmitted through a line 728 to a spool valve 730 in the upper portion of the valve block 674. The spool valve 730 and its companion spool valve 734 in the lower portion of the valve block 674 are moved downwardly by fluid pressure to bring a service line 736 into communication with the pressure line 598. The service line 736 communicates with a port 738 (Fig. 21) in a block 740 in which operate the sequence valves 604. Pressure fluid passing through the port 738 imparts downward movement to a spool valve 742 by reason of the fact that the pressure surface at the upper end of the valve body is greater than the pressure surface at its lower end. The downward movement of the spool valve 742 brings it into its position shown in Fig. 22 and brings the service line 736 into communication with a port 737 and through said port with the service line 334 which communicates with the piston 338 mounted in the cylinder 336. After the pressure in the system has increased to a point where the pressure of a spring 750 in the cylinder 336 is overcome thereby, the cylinder 336 is moved to the right, as seen in Fig. 2, to swing the work supporting assembly from its rest position, shown in Fig. 2, into an upright position. The movement of the cylinder 336 brings the service line 334 into communication with a service line 752 through which pressure fluid is transmitted to the cylinder 46 of the work supporting assembly and to the piston 70 (Fig. 11) mounted in the cylinder thereby moving the work supporting assembly upwardly into its position shown in Fig. 11, this position being determined by the engagement of the holddown arm 238 with the abutment rod 260. The elevation of the jack does not require the full fluid pressure delivered by the pump 580 and consequently there is a brief interval after the piston 70 comes to the limit of its upward movement before the pressure in the service line 736 increases sufficiently to overcome the pressure fluid against the bottom of the sequence valve 754 and to move the valve downwardly to bring the service line 736 into communication with a service line 756 which communicates with three cylinders 422 (Fig. 5), 454 (Fig. 6), and a cylinder 758 (Fig. 6) in the assembly which operates the breast line wiper 358 at the left side of the shoe. Upon the completion of the operation of the wipers pressure fluid in the valve block 740 imparts downward movement to a valve 760 to bring the service line 736 into communication with a line 762 which communicates with a port in the left end of a cylinder 764. Pressure fluid in the line 762 moves a spool valve 766 in the cylinder 764 to the right against the pressure of a spring 768, exhausting fluid in the right end of the cylinder through an exhaust line 770. The movement of the spool valve 766 to the right brings the line 762 into communication with a line 772 which connects the cylinder 764 to the block 526 and to a cylinder 774 in which is mounted a piston 776 which operates to rotate a tack pot or hopper 778 (Fig. 1) During the upward movement of the piston 524 the fluid displaced by the piston is exhausted through a line 780 which is brought into communication with an exhaust line 782 by the movement of the spool valve 766 to the right, as seen in Fig. 17. The line 780 also serves to exhaust the fluid displaced by the upward movement of the piston 776. It will be understood that the locking bolt 570 is held retracted by pressure fluid from the line 594 to permit the operation of the piston 524. The upward movement of the piston 524 overcomes the resistance of the detent 544 (Fig. 5) which normally holds the tack driver retracted and holds the tack driving spring energized. After the resistance of the detent has been overcome the spring actuates the tack driver. The line 772 communicating with the piston 524 also communicates with two other pistons (not shown) in the block 526 for operating the other two tack drivers.

The retraction of the operating instrumentalities and the return of the work supporting assembly to its normal rest position will now be briefly described. Pressure fluid in the block 740 imparts downward movement to a valve 784 thus opening to pressure from the line 736 a service line 786 which communicaes with a block 788 and through a service line 790 with the upper end of the block 648 in the bank of valves 600. Pressure in the line 790 imparts downward movement to a two part valve comprising a piston 794 and a spool 795 both mounted in the block 648. The downward movement of the two part valve closes the port 668 in the block 648 through which fluid is transmitted from the pressure line 598 and the service line 672 to the lower portions of the quadruple valves. The downward movement of the spool 795 brings the lower branch of the pressure line 598 into communication with a service line 796 which communicates through line 798 with the piston 70 which operates the work supporting mechanism, moving the piston downwardly and thus permitting the work support to swing forwardly by gravity into its position shown in Figs. 1 and 2. During the downward movement of the piston 70 the fluid in the cylinder 46 below the piston is exhausted through the line 752 into the cylinder 336 and through a line 826 to the exhaust line 650. The service line 796 also communicates through a line 800 with the piston 253 which operates the holddown 238 thus retracting the holddown from the shoe preparatory to the removal of the shoe from the work support. The service line 796 also communicates through lines 802, 804 and 806 with the wiper operating pistons thus returning said pistons to their respective rest positions and thereby retracting the back line wiper and the breast line wipers.

The return of the bank of valves 600 and the sequence valve assembly 604 to their respective rest positions will now be briefly described. The downward movement of the two part valve assembly 794, 795 brings an exhaust line 808 into communication with the line 672. Inasmuch as the quadruple valve assemblies are now in their respective positions illustrated in Fig. 19 the operation of the two part valve assembly to open the line 672 to exhaust relieves the pressure between the two elements comprising each of the quadruple valve assemblies, thus permitting the four springs at the upper extremities of the respective quadruple valve assemblies to impart downward movement to the upper valve bodies of said assemblies. At an early stage in the downward movement of the upper valve body the port 652 (Fig. 19) and the corresponding ports in the other three units comprising the quadruple valve assemblies are opened to pressure from the line 632. It will be seen that fluid pressure entering the port 652 at this time is brought to bear against the upper extremity of the valve body 658 thus moving the valve body downwardly and exhausting the fluid between it and the valve body 662 and bringing both valves to the limit of their downward movement, as shown in Fig. 20. It will be understood that such downward movement of the valve bodies occurs concomitantly in all four of the units comprising the quadruple valve assemblies. The opening of the line 672 to the exhaust line 808 opens to exhaust the line 736 connected to the valve block 740 thereby rendering the pressure beneath the four sequence valves effective to move them upwardly into their respective rest positions. Such upward movement of the sequence valves brings the lines 762, 756, 334 and 786 into communication with the exhaust line 626. The opening of the line 762 to exhaust relieves the pressure at the left end of the valve block 764 and permits the spring 768 at the right end of the spool valve 766 to move the valve to the left thus opening the line 780 to pressure from the pressure line 594. Thereupon the piston 524 is moved downwardly to retract the tack driver and load the tack driving spring and the piston 776 is moved downwardly to rotate the tack pot. Concomitantly pressure fluid from the line 780 retracts the two pistons (not shown) to load the springs which operate the other two tack drivers. When the piston 524 comes to the limit of its retractive movement the latch 544 (Fig. 5) acts on the arm 542 to hold the tack driving spring energized until the locking bolt 570 is advanced to lock the piston against upward movement. Similar latches are provided in the other two tack driving assemblies for holding the pistons retracted. In order that there will be pressure in the hydraulic system to retract the piston 524 and its companion pistons a delaying valve 810 is provided in the line 646.

Upon the completion of the retraction of the operating instrumentalities and the energizing of the tack driving springs pressure increases in the line 646 communicating through the valve block 648 with the pressure line 598 until it overcomes the resistance offered by the delaying valve 810 and flows through the port in the left end of the valve block 616 moving the spool valve 618 to the right. At this time the port at the right end of the valve block 616 is open to exhaust through the line 634 communicating with the valve block 622 and through the valve block and line 812 with the exhaust line 630. The movement of the spool valve 618 to the right brings the pressure line 606 into communication with the port at the left end of the cylinder 622 through the line 614 communicating with the cylinder 616 and through the line 636 extending from the cylinder 616 to the port at the left end of the cylinder 622. Thus the spool valve 642 in the cylinder 622 is moved to the right while fluid at the right end of the valve is exhausted through the line 640 communicating with the cylinder 616 and through the line 638 extending from the cylinder 616 to the exhaust line 626. The movement of the spool valve 642 to the right brings the pressure line 620 into direct communication with the exhaust line 626 through the cylinder 622 and the line 624 thus relieving the pressure in the entire hydraulic system and permitting the springs at the lower ends of the quadruple valves and the spring at the lower end of the two part valve 794, 795 to move the valves upwardly into a position determined by the engagement of flanges 814 at the lower extremities of the valves with the bases of counterbores formed in the lower end portions of the valve blocks, respectively. The operation of the valve 618 at the end of the hydraulic cycle to relieve the pressure in the hydraulic system renders the spring 574 in the block 526 effective to advance the locking bolt 570 into locking engagement with the piston 524 which, it will be remembered, is peripherally grooved to receive the tapered end of the locking bolt. The bolt remains in locking engagement with the head 522 while the machine is at rest and prevents the release of the tack driver by inadvertent manipulation of the driver lever. It will be understood that similar locking bolts are provided for the other two pistons in the block 526.

In order to permit the retraction of the work clamping instrumentalities without completing the cycle of the machine thereby to permit the correction of the position of the upper materials on the last, the hydraulic system is provided with a manually operated pressure releasing valve 822 which is mounted in the valve block 788 and is movable to the left, as seen in Fig. 17, against the pressure of a spring 824 which normally holds the valve 822 in its position shown in Fig. 17. The movement of the valve 822 to the left brings the pressure line 594 into communication with the line 790 through the block 788 thus forcing the two part valve 794, 795 downwardly and bringing the pressure line 598 into communication with the line 646 through the block 648. The pressure in the line 646 operates as hereinbefore described to move the spool valve 618 to the right thus bringing the port at the left end of the cylinder 622 into communication with the pressure line 614 and moving the valve 642 to the right to bring the pressure line 620 into direct communication with the exhaust line 626. It will be understood that during the interval while the pressure in the line 646 is increasing to overcome the resistance of the delaying valve 810, the work clamping instrumentalities and the wipers are retracted as hereinbefore described and the jack is returned to its normal rest position.

In order to insure the completion of the hydraulic cycle described in the foregoing paragraph in the event that the operator releases the pressure of his hand on the valve 822 immediately after advancing it into operative position, the valve 794, 795 is made in two sections and the lower section 795 has formed therein an axial bore 797 open at its upper end and communicating with the lower end of the upper section of the valve. Communicating with the lower portion of the bore 797 is a radial bore 799 which brings the bore 797 into communication with the lower branch of the pressure line 598 when the valve 794 is at the limit of its downward movement. It will be seen that pressure fluid acting in the bore 797 applies pressure to the lower end of the upper portion of the valve 794 and in the event that the premature return of the valve 822 to its retracted position opens the line 790 to exhaust, the fluid pressure against the lower end of the upper portion of the valve 794 will move the upper portion upwardly into contact with the plate 694 but will hold the lower portion 795 of the valve in the position in which it was located by the operation of the valve 822 thus preventing the premature closing of the lower branch of the pressure line 598 by upward movement of the lower portion 795 of the valve by the pressure of the spring 801 positioned beneath it.

In the preparation of the work for the operation of the illustrated machine thereon a counter which has been molded with an inturned flange is coated with a suitable adhesive and manually inserted between the upper and the lining in the heel end portion of the upper. The quarter lining is then brought into intimate contact with the inner surface of the counter by the pressure of the fingers of the operator against the lining while the upper is held or supported in any convenient manner. After the upper parts have been thus assembled they are mounted on a last to the bottom of which an insole has been attached. After accurately orienting the back line portion of the upper with relation to the last and determining the position of the upper heightwise thereof on the last, the last with the upper mounted thereon is mounted on the last pin 88 and is so oriented that the longitudinal median line of the rear part of the last lies substantially in a vertical plane extending from front to back of the machine. The lasting margins of the upper and the lining at their toe portions are then inserted between the jaws 98 and 100 (Fig. 2) of the toe gripper and the hand lever 128 of the toe gripper assembly is operated first to close the gripper jaws and then to move them in an arcuate path in order to tension the upper longitudinally and to bring its heel end into intimate contact with the heel end portion of the last. The pawl 138 (Fig. 11) acting on the ratchet teeth 140 in the arm 132 maintains the tension on the upper during the operation of the machine. While the work supporting assembly remains in its forwardly swung position shown in Fig. 1, the operator depresses the treadle 610 to initiate the first part of the power cycle of the machine while holding the toe portion of the shoe to maintain the desired orientation thereof, as above described. During the first part of the power cycle the presser members 272 (Fig. 14) are brought into engagement with the heel end portion of the upper at opposite sides of the back line, and substantially simultaneously with the operation of the presser members the locking bolt 202 (Fig. 15) is advanced into locking engagement with teeth 204 in the plate 206 and the holddown arm 238 (Fig. 14) is swung downwardly from its retracted position illustrated in Fig. 2 into its operative position illustrated in Fig. 11. It will be remembered that the locking bolt 202 locks the shoe supporting parts against movement relatively to the head 186, as shown in Fig. 15, but leaves the entire assembly comprising the head 186 and the work supporting means and the operating parts mounted thereon free to swing on the axis of the piston rod 72. During the interval between the first part and the second part of the power cycle of the machine the operator swings the work supporting assembly in a clockwise direction approximately 90° to bring it into a convenient position for the heightwise tensioning of the shoe parts in the region of the heel breast line at the left side of the shoe by means of hand pincers such, for example, as the pincers 87 illustrated in Fig. 10. After tensioning the upper, the counter and the lining as required to bring them into proper relation to the last and to each other the second part of the power cycle is initiated to bring the presser pad 296 into clamping engagement with the breast line portion of the upper. Upon the completion of the advancement of the presser pad the machine again comes to rest and the operator swings the work supporting assembly approximately 180° in a counterclockwise direction to bring the shoe into a position convenient for the tensioning of the upper, counter and lining at the right side of the breast line portion of the shoe. Upon the completion of the tensioning operation the third part of the power cycle is initiated to bring the presser member 298 into clamping engagement with the breast line portion of the upper at the right side of the shoe. Upon the completion of the operation of the presser pad 298 the machine again comes to rest whereupon the operator swings the work supporting assembly approximately 90° in a clockwise direction to bring the assembly into a position determined by the engagement of the detent 222 (Fig. 11) in the groove 224 in the head 76 of the work supporting cylinder 46, thus returning the shoe to its initial position of orientation in which the longitudinal median line of the heel portion of the last lies substantially in a plane extending from front to back of the machine. The operator then inspects the upper to determine whether the heel end portion of the upper is correctly oriented on the last and accurately positioned heightwise of the last. If the operator finds that the upper is incorrectly positioned on the last he presses a knob 828 (Fig. 1) to operate the release valve 822 thus to cause the work supporting assembly to be returned to its rest position and the operating parts to be returned to their respective rest positions in order to permit the position of the upper on the last to be corrected preparatory to the resumption of the machine cycle. If the operator finds that the upper is correctly positioned on the last the treadle 610 is again operated to initiate the fourth and final part of the power cycle. During this part of the cycle the work supporting assembly is swung rearwardly into an upright position and the piston 70 is moved upwardly to bring the work supporting assembly into a position determined by the engagement of the holddown arm 238 (Fig. 11) with the lower end of the abutment rod 260. Thereupon the back line wiper 356 (Fig. 5) and the breast line wipers 358 and 360 are operated concomitantly to wipe the lasting margin of the upper in over the insole, and while the wipers remain in their advanced positions the tackers are operated to secure the overlasted marginal portions of the upper together with the flange of the counter and the bottom margin of the lining to the margin of the insole. Six tacks in all are driven—two at each side of the heel breast line and two at the back line. After the tacks are driven the piston 70 is moved downwardly and the work supporting assembly is swung forwardly into its position shown in Fig. 1 and the operating parts are returned to their respective rest positions. The pawl 122 (Fig. 11) is then manipulated to disengage it from the ratchet teeth in the arm 132 and the handle 128 is swung in a counterclockwise direction, as seen in Fig. 11, to cause the gripper jaws 98 and 100 to open and release their grip on the margin of the toe portion of the upper. The operator then grasps a handle 830 (Fig. 11) formed in the upper portion of the arm 118 and moves it toward him to swing the entire gripper assembly forwardly or in a counterclockwise direction, as seen in Fig. 11, about the crosspin 148 thereby to provide clearance for the removal of the last and the upper assembled thereon from the machine. The forward swinging movement of the gripper assembly causes the pawl 138 to be disengaged from the ratchet teeth 140 by the engagement of the arm 139 (Fig. 9) extending rearwardly from the pawl with the cam surface 141 formed in the lug 152. Upon the disengagement of the pawl from the ratchet teeth the spring 134 (Fig. 11) swings the lever 102 and the parts mounted thereon rearwardly, or in a counterclockwise direction, as seen in Fig. 11, about the pin 116 at the upper end of the arm 118, thus bringing the arm 102 and the parts mounted thereon into their normal relation to the arm 118. After the last and the upper thereon have been removed from the work supporting assembly the operator releases his grip on the handle 830 whereupon the spring 134 swings the entire gripper assembly in a clockwise direction, as seen in Fig. 11, about the crosspin 148 into its normal rest position which is determined by the engagement of the arm 118 with the abutment screw 154.

While the operation of the illustrated machine is herein described with relation to the manufacture of shoes having counters which are molded and inwardly flanged, it is to be understood that the illustrated machine is equally well adapted to operate on shoes provided with counters which have not been previously molded or which have been only partially molded or counters which are in a flaccid condition during the assembling and breast line lasting operations.

Having thus described my invention, what I claim as new and desire to secure by Letters Patent of the United States is:

1. In a shoe machine, a pair of end presser members, power operated means for actuating the end presser members to clamp one extremity of a shoe upper against a form, a pair of side presser members, and power operated means for successively actuating the side presser members to clamp oppositely disposed side portions of the upper against the form.

2. In a shoe machine, a pair of end presser members, power operated means for concomitantly actuating the end presser members to clamp one extremity of a shoe upper against a last, a pair of side presser members, and power operated means for successively actuating the side presser members to clamp oppositely disposed side portions of the upper against the last.

3. In a shoe machine, a first presser member, a second presser member, power operated means for successively actuating the presser members to clamp oppositely disposed side portions of a shoe upper against a form, and means for causing the machine to be at rest during a period following the operation of the first presser member and preceding the operation of the second presser member.

4. In a shoe machine, a first presser member, a second presser member, pressure fluid operated means for successively actuating the presser members to clamp side portions of a shoe upper against a form, and a valve operable to cause the machine to be at rest during a period following the operation of the first presser member and preceding the operation of the second presser member.

5. In a shoe machine, a pair of end presser members, power operated means for actuating the end presser members to clamp one extremity of a shoe upper against a form, a first side presser member, a second side presser member, power operated means for successively actuating the side presser members to clamp oppositely disposed side portions of the upper against the form, and means for causing the machine to be at rest during a period following the operation of the first side presser member and preceding the operation of the second side presser member.

6. In a shoe machine, a pair of end presser members, power operated means for actuating the end presser members to clamp one extremity of a shoe upper against a form, a first side presser member, a second presser member, power operated means for successively actuating the side presser members to clamp oppositely disposed side portions of the upper against the form, means for causing the machine to be at rest during a period following the actuation of the end presser members and preceding the actuation of the first side presser member, and means for causing the machine to be at rest during a period following the actuation of the first side presser member and preceding the operation of the second side presser member.

7. In a shoe machine, a pair of end presser members, power operated means for actuating the end presser members to clamp one extremity of a shoe upper against a last, a pair of side presser members, power operated means for actuating the side presser members to clamp oppositely disposed side portions of the upper against the last, means for wiping the lasting margin of the upper over an insole on a last bottom, power operated means for actuating the wiping means, means for causing the machine to be at rest during a period following the actuation of the end presser members and preceding the actuation of the side presser members, and means for causing the machine to be at rest during a period following the actuation of the side presser members and preceding the operation of the wiping means.

8. In a shoe machine, a pair of end presser members, power operated means for actuating the end presser members to clamp one extremity of a shoe upper against a last, a first side presser member, a second side presser member, power operated means for successively actuating the side presser members to clamp oppositely disposed side portions of the upper against the last, means for wiping predetermined portions of the lasting margin of the upper over an insole on the last bottom, power operated means for actuating the lasting means, means for causing the machine to be at rest during a period following the actuation of the end presser members and preceding the actuation of the first side presser member, means for causing the machine to be at rest during a period following the actuation of the first side presser member and preceding the operation of the second side presser member, and means for causing the machine to be at rest during a period following the operation of the second side presser member and preceding the operation of the wiping means.

9. In a shoe machine, a gripper assembly comprising a lever, a pair of gripper jaws mounted on the lever, an actuator mounted on the lever, a member on the actuator operable by movement of the actuator to close the jaws, a member on the actuator operable by movement of the actuator to open the jaws, a member on which the lever is fulcrumed, a carrier on which the member is pivotally mounted, and means for determining one position of the member relatively to the carrier.

10. In a shoe machine, a gripper assembly comprising a lever, gripper jaws mounted on the lever, a member on which the lever is fulcrumed, a carrier on which the member is pivotally mounted, means for mounting a last having an upper thereon, and means on the member for determining a position of the last heightwise thereon.

11. In a shoe machine a gripper assembly comprising a lever, gripper jaws mounted on the lever, a member on which the lever is fulcrumed, a carrier on which the member is pivotally mounted, means for mounting a last having an upper thereon, an eccentric roll adjustably mounted on the member and arranged to engage the last thereby to determine one position of the last heightwise thereof.

12. In a shoe machine a pair of gripper jaws, a first lever on which the jaws are mounted, a member on which the first lever is fulcrumed, and a hand lever fulcrumed on the first lever, said hand lever being operable first to close the gripper jaws and thereafter to actuate the first lever to impart a movement of translation to the gripper jaws.

13. In a shoe machine a pair of gripper jaws, a first lever on which the jaws are mounted, a member on which the first lever is fulcrumed, a hand lever fulcrumed on the first lever, said hand lever being operable first to close the gripper jaws and thereafter to actuate the first lever to impart a movement of translation to the gripper jaws, and a pawl for holding the hand lever against movement in one direction relatively to the first lever.

14. In a shoe machine a pair of gripper jaws, a first lever on which the jaws are mounted, a member on which the first lever is fulcrumed, a hand lever fulcrumed on the first lever, said hand lever being operable first to close the griper jaws and thereafter to actuate the first lever to impart a movement of transltaion to the gripper jaws, and a pawl for holding the first lever against movement in one direction.

15. In a shoe machine a pair of gripper jaws, a first lever on which the jaws are mounted, a member on which the first lever is fulcrumed, a hand lever fulcrumed on the first lever, said hand lever being operable first to close the gripper jaws and thereafter to actuate the first lever to impart a movement of translation to the gripper jaws, a first pawl for holding the hand lever against movement in one direction relatively to the first lever, and a second pawl for holding the first lever against movement in one direction.

16. In a shoe machine a pair of gripper jaws, a first lever on which the jaws are mounted, an arm on which the first lever is fulcrumed, a hand lever fulcrumed on the first lever, means whereby the hand lever closes and opens the gripper jaws, a first pawl for holding the hand lever against movement in one direction relatively to the first lever, and a second pawl for holding the first lever against movement in one direction relatively to the arm.

17. In a shoe machine a pair of gripper jaws, a first lever on which the jaws are mounted, an arm on which the first lever is fulcrumed, a hand lever fulcrumed on the first lever, means whereby the hand lever closes and opens the griper jaws, a first pawl for holding the hand lever against movement in one direction relatively to the first lever, a second pawl for holding the first lever against movement in one direction relatively to the arm, a member on which the arm is pivotally mounted, and means operated by movement of the arm relatively to the member for releasing the second pawl.

18. In a shoe machine a pair of gripper jaws, a first lever on which the jaws are mounted, an arm on which the first lever is fulcrumed, a hand lever fulcrumed on the first lever, means whereby the hand lever closes and opens the gripper jaws, a first pawl for holding the hand lever against movement in one direction relatively to the first lever, a second pawl for holding the first lever against movement in one direction relatively to the arm, a member on which the arm is pivotally mounted, means operated by movement of the arm relatively to the member for releasing the second pawl, and a spring operating upon the release of the second pawl to move the first lever relatively to the arm.

19. In a shoe machine a pair of gripper jaws, a lever on which the jaws are mounted, an arm on which the lever is fulcrumed, a member on which the arm is pivotally mounted, means for holding the lever against movement in one direction relatively to the arm, and means operated by movement of the arm relatively to the member for releasing the holding means.

20. In a shoe machine a pair of gripper jaws, a lever on which the jaws are mounted, an arm on which the lever is fulcrumed, a carrier on which the arm is pivotally mounted, a pawl for holding the lever against movement in one direction relatively to the arm, and means operated by movement of the arm relatively to the carrier for releasing the pawl.

21. In a shoe machine a pair of gripper jaws, a lever on which the jaws are mounted, an arm on which the lever is fulcrumed, means for holding the lever against movement in one direction relatively to the arm, a member on which the arm is pivotally mounted, means operated by movement of the arm relatively to the member for releasing the holding means, and a spring operating upon the release of the holding means to move the lever relatively to the arm.

22. In a shoe machine a pair of gripper jaws, a lever on which the jaws are mounted, an arm on which the lever is fulcrumed, a member on which the arm is pivotally mounted, an abutment member for limiting movement of the arm in one direction, a pawl for holding the lever against movement in one direction relatively to the arm, means operated by movement of the arm relatively to the member for releasing the pawl, and a spring operating upon the release of the pawl to move the lever relatively to the arm and to move the assembly comprising the arm, the lever and the gripper jaws into a position determined by the engagement of the arm with the abutment member.

23. In a shoe machine a pair of gripper jaws, a lever on which the jaws are mounted, an arm on which the lever is fulcrumed, a member on which the arm is pivotally mounted, a pawl for holding the lever against movement in one direction relatively to the arm, and a cam for causing the release of the pawl during relative movement of the arm and the member.

24. In a shoe machine work supporting means comprising a carrier, a head, and an elevator on which the carrier and the head are mounted for relative angular movement, means including a normally retracted locking member for fixing the relative orientation of the carrier and the head, and means for determining the orientation of the work supporting means relatively to the elevator.

25. In a shoe machine work supporting means comprising a carrier and a head constructed and arranged for relative angular movement in a plane substantially perpendicular to the heightwise axis of a last on the work supporting means, a toe gripper mounted on the carrier, and heel end clamping means carried by the head.

26. In a shoe machine work supporting means comprising a carrier and a head constructed and arranged for relative angular movement, a toe gripper mounted on the carrier, and a last holddown mounted on the head.

27. In a shoe machine work supporting means comprising a carrier and a head constructed and arranged for relative angular movement, a toe gripper mounted on the carrier, and a last holddown mounted on the head for movement relatively to the head to and from operative position.

28. In a shoe machine work supporting means comprising a carrier and a head constructed and arranged for relative angular movement and work engaging means carried by the head and comprising a holddown, means for clamping the heel end portion of a shoe upper against a last supported by the work supporting means, and side pressers for clamping opposite side portions of the upper against the last.

29. In a shoe machine work supporting means comprising a carrier and a head constructed and arranged for relative angular movement and work engaging means carried by the head and comprising a holddown, means for clamping the heel end portion of a shoe upper against a last supported by the work supporting means, side pressers for clamping opposite side portions of the upper against the last, and a detent for fixing the relative orientation of the carrier and the head.

30. In a shoe machine work supporting means comprising a carrier and a head constructed and arranged for relative angular movement, a toe gripper mounted on the carrier, a work engaging means carried by the head comprising a last holddown, a plurality of pads constructed and arranged to clamp the heel end portion of a shoe upper against a last on the work supporting means, and a pair of side pressers constructed and arranged to clamp opposite sides of the heel portion of the upper against the last.

31. In a shoe machine work supporting means comprising an elevator constructed and arranged to support a last having a shoe upper thereon, a carrier and a head mounted on the elevator for relative angular movement, a toe gripper mounted on the carrier, and work clamping means carried by the head.

32. In a shoe machine an elevator constructed and arranged to support a last having a shoe upper mounted thereon, a head carried by the elevator, a last holddown carried by the head, and mechanism including means in the head for swinging the holddown to and from operative position.

33. In a shoe machine an elevator constructed and arranged to support a last having a shoe upper mounted thereon, a head carried by the elevator, a last holddown carried by the head, a pressure fluid operated piston mounted in the head and constructed and arranged to move the holddown to and from operative position.

34. In a shoe machine an elevator constructed and arranged to support a last having a shoe upper mounted thereon, a head carried by the elevator, a last holddown carried by the head and constructed and arranged for movement to and from operative position, and a member carried by the head and arranged to maintain the holddown rigidly in operative position.

35. In a shoe machine an elevator constructed and arranged to support a last having a shoe upper thereon, a head carried by the elevator, a pressure fluid operated piston carried by the head, a last holddown mounted on the piston for angular movement to and from operative position, and a member mounted in the head and effective during movement of the piston in one direction to cause angular movement of the holddown from a retracted position into its operative position.

36. In a shoe machine a piston rod, a last pin at the free end of the piston rod for supporting a last having a shoe upper mounted thereon, a carrier and a head constructed and arranged for relative angular movement on the axis of the piston rod, a toe gripper mounted on the carrier, and heel end clamping means carried by the head.

37. In a shoe machine a piston rod, a last pin at the free end of the piston rod for supporting a last having a shoe upper mounted thereon, a carrier and a head mounted on the piston rod and constructed and arranged for relative angular movement on the axis of the rod, a toe gripper mounted on the carrier, and a plurality of presser pads carried by the head and constructed and arranged to clamp the heel end portion of the upper against the last.

38. In a shoe machine a piston rod constructed and arranged to support a last having a shoe upper mounted thereon, a carrier and a head mounted on the piston rod and constructed and arranged for relative angular movement on the axis of the rod, fixed means constructed and arranged to be engaged by the head during movement thereof in one direction to hold the head against angular movement on the piston rod, and means for securing the carrier against angular movement relatively to the head.

39. In a shoe machine a piston rod constructed and arranged to support a last having a shoe upper mounted thereon, a carrier and a head mounted on the piston rod and constructed and arranged for relative angular movement on the axis of the rod, fixed means constructed and arranged to be engaged by the head during movement thereof in one direction to hold the head against angular movement on the piston rod, and a member for locking the carrier against angular movement relatively to the head.

40. In a shoe machine a piston rod constructed and arranged to support a last having a shoe upper mounted thereon, a carrier and a head mounted on the piston rod and constructed and arranged for relative angular movement on the axis of the rod, fixed means constructed and arranged to be engaged by the head during movement thereof in one direction to hold the head against angular movement on the piston rod, a bolt for locking the carrier against angular movement relatively to the head, and pressure fluid operated means for advancing the bolt.

41. In a shoe machine a cylinder mounted for angular movement, a piston mounted in the cylinder, a piston rod on which the piston is mounted, a last pin at the free end of the piston for mounting a last having a shoe upper mounted thereon, a carrier and a head mounted on the piston rod for relative angular movement on the axis of the rod, a member rendered effective by movement of the piston in one direction to hold the head against angular movement on the rod, and means for locking the carrier against angular movement relatively to the head.

42. In a shoe machine a cylinder mounted for angular movement, a piston mounted in the cylinder, a piston rod projecting from the piston and constructed and arranged to support at its free end a last having a shoe upper mounted thereon, a carrier and a head mounted on the piston rod for relative angular movement, cam means for holding the head against such angular movement, and a bolt for locking the carrier against angular movement relatively to the head.

43. In a shoe machine a cylinder mounted for angular movement, a piston mounted in the cylinder, a piston rod projecting from the piston and constructed and arranged to support at its free end a last having a shoe upper mounted thereon, a carrier and a head mounted on the piston rod for relative angular movement, cam means for holding the head against such angular movement, means for holding the carrier against angular movement relatively to the head, a slide mounted in the carrier, and toe gripper mechanism mounted on the slide.

44. In a shoe machine a cylinder mounted for angular movement to and from a vertical position, a piston in the cylinder operable by pressure fluid after the cylinder has been advanced into its vertical position, a head mounted on the piston for angular and translatory movements, and fixed cam means rendered effective by the operation of the piston to hold the head against angular and translatory movements.

45. In a shoe machine, a cylinder mounted for angular movement to and from a vertical position, a piston in the cylinder operable by pressure fluid after the cylinder has been advanced into its vertical position, a piston rod projecting from the piston, a head mounted on the piston rod, fixed cam means rendered effective by the operation of the piston to hold the head against angular and translatory movements, a carrier mounted on the piston rod for angular movement about the axis of the piston rod relatively to the head, and means mounted in the head for locking the carrier against angular movement relatively to the head.

46. In a shoe machine a cylinder, a piston mounted in the cylinder, a piston rod projecting from the piston, a head mounted on the piston rod, means for determining the orientation of the head when the piston is at the limit of its movement in one direction, and means for determining the orientation of the head when the piston is at the limit of its movement in the opposite direction.

47. In a shoe machine a cylinder, a piston mounted in the cylinder, a piston rod projecting from the piston, a head mounted on the piston rod, a latch member for determining a position of orientation of the head when the piston is at the limit of its movement in one direction, and means for securing the head against angular movement relatively to the piston when the piston is at the limit of its movement in the opposite direction.

48. In a shoe machine an elevator constructed and arranged to support a last having a shoe upper mounted thereon, a head carried by the elevator, a last holddown carried by the head, and an abutment member constructed and arranged to be engaged by the holddown to arrest the operation of the elevator.

49. In a shoe machine an elevator constructed and arranged to support a last having a shoe upper mounted thereon, a head carried by the elevator, a last holddown carried by the head, an abutment member constructed and arranged to be engaged by the holddown to arrest the operation of the elevator, and means for adjusting the abutment member heightwise of the last.

50. In a shoe machine an elevator constructed and arranged to support a last having a shoe upper thereon, a head carried by the elevator, a last holddown mounted in the head, a machine frame, an abutment rod mounted in the frame and constructed and arranged to be engaged by the last holddown to arrest the operation of the elevator, and means for adjusting the abutment rod heightwise of the last.

51. In a shoe machine work supporting means comprising a carrier and a head constructed and arranged for relative angular movement, means mounted on the head for clamping the heel end portion of a shoe upper against a last on the work supporting means, a slide mounted in the carrier for movement relatively to the carrier lengthwise of the last, and a toe gripper mounted on the slide.

52. In a shoe machine work supporting means comprising a carrier and a head constructed and arranged for relative angular movement, means mounted on the head for clamping the heel end portion of a shoe upper against a last on the work supporting means, a slide mounted in the carrier for movement relatively to the carrier lengthwise of the last, a toe gripper mounted on the slide, and means for securing the slide in adjusted position relatively to the carrier.

53. In a shoe machine work supporting means comprising a carrier and a head constructed and arranged for relative angular movement, a slide mounted in the carrier, a toe gripper mounted on the slide, and work engaging means carried by the head and comprising a holddown, means for clamping the heel end portion of a shoe upper against a last supported by the work supporting means, and side pressers for clamping opposite side portions of the upper against the last.

54. In a shoe machine, means for clamping an end portion of a shoe upper against a last, a side presser for clamping a side portion of the upper against the last, pressure fluid operated means for actuating the clamping means and the side presser in successive steps after each of which steps the machine comes to rest, the pressure fluid operated means being effective during the rest period to maintain the pressure of the clamping means against the upper .

55. In a shoe machine, means for clamping an end portion of a shoe upper against a last, a first side presser for clamping a side portion of the upper against the last, a second side presser for clamping another side portion of the upper against the last, a wiper for wiping a portion of the bottom margin of the upper inwardly over an insole on the last bottom, pressure fluid operated means for actuating the clamping means, the first side presser, the second side presser and the wiper in successive steps after each of which the machine comes to rest, and manually operating means for initiating each step of the operation of the pressure fluid operated means.

56. In a shoe machine, operating instrumentalities comprising means for clamping an end portion of a shoe upper against a last, a first side presser, a second side presser, a wiper, fastening means incorporated in the wiper, pressure fluid operated means for actuating the clamping means, the first side presser, the second side presser and the wiper and fastening means in successive steps after each of which steps the machine comes to rest while the pressure fluid operated means maintains during the rest periods the pressure applied to the operating instrumentalities, and manually operated means for initiating each step of the operation of the pressure fluid operated means.

57. In a shoe machine, a cylinder mounted for swinging movement, a piston mounted in the cylinder, means on the piston for supporting a last having a shoe upper mounted thereon, a last holddown, a first side presser, a second side presser, a wiper, and pressure fluid operated means operable in successive steps and in the following order to actuate the last holddown, the first side presser and the second side presser, to swing the cylinder, then to actuate the piston in order to bring the last and upper into position for the wiping operation and finally to operate the wiper.

58. In a shoe machine, a cylinder mounted for swinging movement, a piston mounted in the cylinder, means on the piston for supporting a last having a shoe upper mounted thereon, a last holddown, a first side presser, a second side presser, a wiper, pressure fluid operated means operable in successive steps and in the following order to actuate the last holddown, the first side presser and the second side presser, to swing the cylinder, then to actuate the piston in order to bring the last and upper into position for the wiping operation and finally to operate the wiper, and manually operated means for initiating each step of the operation of the pressure fluid operated means at the will of the operator.

59. In a shoe machine, pressure fluid operated elements comprising a cylinder mounted for swinging movement, a piston mounted in the cylinder, means on the piston for supporting a last having a shoe upper mounted thereon, a last holddown, a first side presser, a second side presser, and a wiper, and pressure fluid operated means operable in successive steps and in the following order to actuate the last holddown, the first side presser and the second side presser, to swing the cylinder, then to actuate the piston in order to bring the last and upper into position for the wiping operation and finally to operate the wiper, the pressure fluid operated means being effective during rest intervals between the steps to maintain the pressure imparted to the elements.

60. In a shoe machine, work supporting means comprising a head and a carrier constructed and arranged for relative angular movement on an axis extending heightwise of a shoe in the machine, heel end clamping instrumentalities mounted in the head, means for holding the head and the carrier against relative angular movement, and power operated means for actuating the heel end clamping instrumentalities and the holding means and for holding them in operative position during a rest period in the power cycle of the machine following immediately after the actuation of said instrumentalities and said holding means and preceding a further operation of the power cycle of the machine.

61. In a hydraulically operated shoe machine, work supporting means comprising a head and a carrier relatively movable on an axis extending heightwise of a shoe in the machine, heel end clamping instrumentalities mounted in the head, a member for locking the head and the carrier against relative angular movement, and a pressure fluid system operable to actuate the heel end clamping instrumentalities and the member and to hold them in operative position by fluid pressure during a rest interval in the power cycle of the machine following immediately after the operation of the heel end clamping instrumentalities and the member and preceding another stage in the hydraulic operation of the machine.

62. In a shoe machine, a cylinder mounted for swinging movement, a piston mounted in the cylinder, a last support mounted on the piston, a plurality of lasting wipers, means for swinging the cylinder into a position of alinement with the wipers, means for actuating the piston to bring the last and the upper into a proper elevation for the lasting operation, and means for actuating the wipers to wipe the bottom margin of the upper in over an insole on the last bottom.

63. In a shoe machine, a cylinder mounted to swing on a transverse axis, a piston mounted in the cylinder for movement endwise thereof, a last support mounted on the piston, a last holddown carried by the last support, pressers carried by the last support, means for actuating the pressers to clamp a shoe upper against the last, a plurality of lasting wipers, means for advancing the last supporting assembly thereby to bring the last and the upper into position to be operated upon by the wipers, and means for actuating the wipers to wipe the bottom margin of the upper in over an insole on the last bottom.

64. In a shoe machine, a work supporting assembly comprising a last support, a plurality of pressers members for clamping a shoe upper having a lasting margin against a last on the support, and a last holddown, a back line wiper, breast line wipers, an elevator for imparting upward movement to the work supporting assembly thereby to bring the last and the upper into position to be operated upon by the wipers, and means for actuating the wipers to wipe the lasting margin of the upper over an insole on the last bottom.

65. In a shoe machine, a work supporting assembly including a cylinder and a piston mounted therein, the work supporting assembly being operable to advance the last and a shoe upper thereon from a loading station to a lasting station, a last support mounted on the piston, a plurality of lasting wipers, means for actuating the piston to bring the last and the upper thereon into the lasting station, and means for actuating the wipers to wipe the bottom margin of the upper in over an insole on the last bottom.

66. In a shoe machine, work supporting means including a cylinder and a piston mounted in the cylinder, said work supporting means being operable to advance a last and a shoe upper thereon from an assembling station to a lasting station, a last support mounted on the piston, a plurality of lasting wipers, means for advancing the work supporting assembly into a position of alinement with the lasting station, means for actuating the piston to advance the last and the upper thereon into the lasting station, and means for actuating the wipers to wipe the bottom margin of the upper in over an insole on the last bottom.

67. In a shoe machine, work supporting means including a cylinder and a piston mounted in the cylinder, said work supporting means being operable to advance a last and a shoe upper thereon from an assembling station to a lasting station, a last support mounted on the piston, a plurality of lasting wipers, means for advancing the work supporting assembly into a position of alinement with the lasting station, means operating through fluid transmission means for actuating the piston to advance the last and the upper thereon into the lasting station and to maintain the last and the upper in the lasting station during the operation of the lasting wipers, and means for actuating the wipers to wipe the bottom margin of the upper in over an insole on the last bottom.

68. In a shoe machihne, work supporting means including a cylinder, a piston mounted on the cylinder, and a last support mounted on the piston, a plurality of lasting wipers, abutment means for determining the position of the work supporting means relatively to the wipers during the wiping operation, a source of power, a hydraulic transmission system through which power from said source actuates the piston to advance a last support into a position determined by the abutment means, and means for actuating the wipers to wipe the bottom margin of an upper in over an insole on the bottom of a last mounted on the last support.

69. In a shoe machine, work supporting means including a cylinder, a piston mounted in the cylinder and a last support mounted on the piston, a wiper assembly comprising a back line wiper and a pair of breast line wipers, an arm on which the back line wiper is mounted, two arms for mounting the breast line wipers, respectively, a carrier for mounting the two arms, means for moving the carrier to adjust the breast line wipers lengthwise only of a last in the machine, means for actuating the piston to impart upward movement to the work supporting assembly thereby to bring the last and an upper thereon into position to be operated upon by the wipers, and means for actuating the wipers to wipe the bottom margin of the upper in over an insole on the last bottom.

References Cited in the file of this patent
UNITED STATES PATENTS

| | | |
|---|---|---|
| 178,598 | Collyer | June 13, 1876 |
| 635,124 | Bullard | Oct. 17, 1899 |
| 693,620 | Preston | Feb. 18, 1902 |
| 1,336,875 | Wentworth | Apr. 13, 1920 |
| 1,474,348 | Erickson | Nov. 20, 1923 |
| 1,974,264 | Daly | Sept. 18, 1934 |
| 2,096,761 | Ricks et al. | Oct. 26, 1937 |
| 2,116,819 | Bata | May 20, 1938 |
| 2,138,099 | Holmgren | Nov. 29, 1938 |
| 2,214,043 | Clarke | Sept. 10, 1940 |
| 2,275,487 | Ashley | Mar. 10, 1942 |
| 2,316,944 | Ernst | Apr. 20, 1943 |
| 2,347,238 | Bennett | Apr. 25, 1944 |
| 2,452,115 | Feasey | Oct. 26, 1948 |
| 2,490,901 | Eastman et al. | Dec. 13, 1949 |
| 2,639,728 | Briechle | May 26, 1953 |